United States Patent
Takenaka et al.

(10) Patent No.: US 10,676,371 B2
(45) Date of Patent: Jun. 9, 2020

(54) RUTHENIUM OXIDE HAVING A NEGATIVE THERMAL EXPANSION COEFFICIENT, AND USEABLE AS A THERMAL EXPANSION INHIBITOR

(71) Applicant: NATIONAL UNIVERSITY CORPORATION NAGOYA UNIVERSITY, Nagoya-shi, Aichi-ken (JP)

(72) Inventors: Koshi Takenaka, Nagoya (JP); Yoshihiko Okamoto, Nagoya (JP); Tsubasa Shinoda, Nagoya (JP); Naruhiro Inoue, Nagoya (JP)

(73) Assignee: NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 0 days.

(21) Appl. No.: 16/075,841

(22) PCT Filed: Feb. 10, 2017

(86) PCT No.: PCT/JP2017/004948
§ 371 (c)(1),
(2) Date: Aug. 6, 2018

(87) PCT Pub. No.: WO2017/138643
PCT Pub. Date: Aug. 17, 2017

(65) Prior Publication Data
US 2019/0031528 A1    Jan. 31, 2019

(30) Foreign Application Priority Data
Feb. 12, 2016    (JP) .................................. 2016-024783

(51) Int. Cl.
C01G 55/00    (2006.01)

(52) U.S. Cl.
CPC ............ *C01G 55/004* (2013.01); *C01G 55/00* (2013.01); *C01G 55/002* (2013.01); *C01P 2002/76* (2013.01); *C01P 2006/32* (2013.01)

(58) Field of Classification Search
CPC ........................... C01G 55/004; C01G 55/002
See application file for complete search history.

(56) References Cited

U.S. PATENT DOCUMENTS 7,632,480 B2    12/2009    Takenaka et al.
2008/0124265 A1*  5/2008   Gur ...................... C01G 55/002
                                                                 423/263

(Continued)

FOREIGN PATENT DOCUMENTS

JP    2003-146693 A    5/2003
JP    2012-056830 A    3/2012

(Continued)

OTHER PUBLICATIONS

Nakatsuji, Satoru et al., "Ca2RuO4: New Mott Insulators of Layered Ruthenate.", Journal of the Physical Society of Japan, vol. 66, No. 7, pp. 1868-1871. (1997).

(Continued)

*Primary Examiner* — Melvin C. Mayes
*Assistant Examiner* — Michael Forrest
(74) *Attorney, Agent, or Firm* — Oliff PLC

(57) ABSTRACT

A ruthenium compound exhibits large negative thermal expansion. The ruthenium oxide is represented by the formula (1) $Ca_{2-x}R_xRu_{1-y}M_yO_{4+z}$ (wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: $0 \leq x < 0.2$, $0 \leq y < 0.3$, and $-1 < z < -0.02$).

18 Claims, 11 Drawing Sheets

(56) References Cited

U.S. PATENT DOCUMENTS

| | | | |
|---|---|---|---|
| 2009/0004087 A1 | 1/2009 | Takenaka et al. | |
| 2012/0040196 A1 | 2/2012 | Kubota et al. | |
| 2014/0234643 A1 | 8/2014 | Kubota et al. | |

FOREIGN PATENT DOCUMENTS

| | | | |
|---|---|---|---|
| JP | 2015-221749 A | 12/2015 | |
| WO | 2006/011590 A1 | 2/2006 | |
| WO | 2010/101153 A1 | 9/2010 | |

OTHER PUBLICATIONS

Braden M., el al. "Crystal and magnetic structure of Ca2RuO4: Magnetoelastic coupling and the metal-insulator transition.", Physical Review B, vol. 58, No. 2, pp. 847-861, (1998).

Friedt, O., et al., "Structural and magnetic aspects of the metal-insulator transition in Ca2-xSrxRuO4.", Physical Review B, vol. 63, No. 17, pp. 174432-1 to 174432-10, (2001).

Qi, T.F., et al., "Negative Volume Thermal Expansion Via Orbital and Magnetic Orders in Ca2Ru1-xCrxO4(0<x<0.13).", Physical Review Letters, vol. 105, No. 17, pp. 177203-1 to 177203-4, (2010).

Qi, T.F., et al., "Magnetic and orbital orders coupled to negative thermal expansion in Mott insulators Ca2Ru1-xMxO4(M=Mn and Fe).", Physical Review B, vol. 85, No. 16, pp. 165143-1 to 165143-6, (2012).

Nakatsuji, Satoru et al., "Synthesis and Single-Crystal Growth of Ca2-xSrxRuO4.", Journal of Solid State Chemistry, vol. 156, No. 1, pp. 26-31, (2001).

Takenaka, Koshi et al., "Colossal negative thermal expansion in reduced layered ruthenate.", Nature Communications, pp. 1-7, (2017).

Mar. 21, 2017 International Search Report issued in Patent Application No. PCT/JP2017/004948.

Mar. 21, 2017 Written Opinion of the International Searching Authority issued in International Patent Application No. PCT/JP2017/004948.

* cited by examiner

RUTHENIUM OXIDE HAVING A NEGATIVE THERMAL EXPANSION COEFFICIENT, AND USEABLE AS A THERMAL EXPANSION INHIBITOR

TECHNICAL FIELD

The present disclosure relates to an oxygen-deficient ruthenium oxide and a ruthenium oxide having a negative thermal expansion coefficient, and to a method for producing these ruthenium oxides. The present disclosure also relates to a thermal expansion inhibitor for reducing thermal expansion caused by an increase in temperature, and a negative thermal expansion material, a zero thermal expansion material, and a low thermal expansion material, each material containing a ruthenium oxide.

BACKGROUND ART

In general, a substance is known to undergo thermal expansion in association with an increase in temperature. Thus, parts used in a device which undergoes temperature change (e.g., an electronic instrument or a precision instrument) may cause various problems due to their thermal expansion.

There have been proposed methods for reducing thermal expansions occurring at different temperatures, such as a method involving combination of a positive thermal expansion material and a negative thermal expansion material.

Patent Document 1 describes use of a negative thermal expansion material, such as a ceramic or glass ceramic material having a negative linear expansion coefficient of $-1 \times 10^{-6}/°C$. to $-12 \times 10^{-6}/°C$. within a temperature range of $-40°$ C. to $100°$ C. Examples of the ceramic or glass ceramic material include a ceramic or glass ceramic material containing, as a main crystal phase, a β-quartz solid solution or a β-eucryptite solid solution, and a polycrystalline ceramic material containing, as a main crystal phase, a phosphate tungstate or tungstate containing at least one of Zr and Hf.

Patent Document 2 describes that an anti-perovskite manganese nitride represented by, for example, $Mn_3Zn_{1-x}Ge_xN$ (x=0.3 to 0.5) exhibits a negative linear expansion coefficient of $-30 \times 10^{-6}/°C$. within a temperature range of $51°$ C. to $104°$ C. Patent Document 2 discloses a low thermal expansion material or negative thermal expansion material containing such a nitride, and a thermal expansion reducing method involving the use of such a nitride.

However, hitherto known negative thermal expansion materials pose problems (e.g., low degree of negative thermal expansion, and narrow operation temperature range for negative thermal expansion) and have only limited applications. The practical use of such a conventional negative thermal expansion material requires various conditions, and the material is used in a narrow range of applications. Thus, such a material is not satisfactory as a thermal expansion inhibitor.

As has been known, when a ruthenium oxide represented by $Ca_2RuO_4$ and having a layered perovskite crystal structure undergoes phase transition at about $90°$ C., from a high-temperature metal phase (high-temperature L phase) to a low-temperature insulator phase (low-temperature S phase), the volume of the low-temperature phase is larger than that of the high-temperature phase (Non-Patent Documents 1 to 5). For example, precise structural analysis of $Ca_2RuO_4$ shows that a decrease in temperature from $127°$ C. to $-173°$ C. causes a total volume variation $\Delta V/V$ (expansion) of about 1% (Non-Patent Document 3). As used herein, the term "total volume variation $\Delta V/V$" refers to a value obtained by the formula (Vmin−Vmax)/Vmax, wherein Vmin represents the volume at Tmin (within a temperature range of negative thermal expansion from Tmin to Tmax), and Vmax represents the volume at Tmax. It has been reported that $Ca_2Ru_{0.933}Cr_{0.067}O_4$ (prepared through substitution of a portion of Ru of $Ca_2RuO_4$ by Cr) exhibits volume expansion (total volume variation $\Delta V/V=0.9\%$) caused by a successive decrease in temperature (Non-Patent Document 4), and $Ca_2Ru_{0.90}Mn_{0.10}O_4$ exhibits a negative thermal expansion of $-10 \times 10^{-6}/°$ C. ($\Delta V/V \approx 0.8\%$) within a temperature range of $-143°$ C. to $127°$ C. (Non-Patent Document 5).

However, none of the ruthenium oxides exhibiting the aforementioned phenomena can be used as a highly functional, industrial thermal expansion inhibitor, for the following reasons: a generally narrow transition width of $1°$ C. or less during sharp primary phase transition, and lack of large negative thermal expansion showing a total volume variation more than 1%.

PRIOR ART DOCUMENTS

Patent Documents

Patent Document 1: Japanese Patent Application Laid-Open (kokai) No. 2003-146693
Patent Document 2: International Patent Publication WO2006/011590

Non-Patent Documents

Non-Patent Document 1: S. Nakatsuji, S. Ikeda, and Y. Maeno, J. Phys. Soc. Jpn. 66, 1868-1871 (1997).
Non-Patent Document 2: M. Braden, et al., Phys. Rev. B 58, 847-861 (1998).
Non-Patent Document 3: O. Friedt, et al., Phys. Rev. B 63, 174432 (2001).
Non-Patent Document 4: T. F. Qi, et al., Phys. Rev. Lett. 105, 177203 (2010).
Non-Patent Document 5: T. F. Qi, et al., Phys. Rev. B 85, 165143 (2012).

SUMMARY OF THE INVENTION

Problem to be Solved by the Invention

The present disclosure provides a novel ruthenium oxide. In particular, an object of the present disclosure for solving the aforementioned problems is to provide a compound exhibiting negative thermal expansion larger than that of a conventional material, and a method for producing the compound. Another object is to provide a thermal expansion inhibitor, a negative thermal expansion material, and a low thermal expansion material, each of which contains the compound.

Means for Solving the Problem

The present inventors have conducted extensive studies on compounds exhibiting negative thermal expansion, and as a result have found that, surprisingly, reductive thermal treatment of $Ca_2RuO_4$ achieves negative thermal expansion property with a very large total volume variation $\Delta V/V$. The present disclosure has been accomplished on the basis of this finding. Specifically, the present disclosure has been achieved by the following means.

Accordingly, the present disclosure provides a ruthenium oxide represented by the following formula (1):

$$Ca_{2-x}R_xRu_{1-y}M_yO_{4+z} \quad \text{formula (1):}$$

(wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: $0 \leq x < 0.2$, $0 \leq y < 0.3$, and $-1 < z < -0.02$).

Advantageous Effects of the Invention

As described above, the present disclosure provides a compound exhibiting negative thermal expansion larger than that of a conventional material.

MODES FOR CARRYING OUT THE INVENTION

Figure 1:
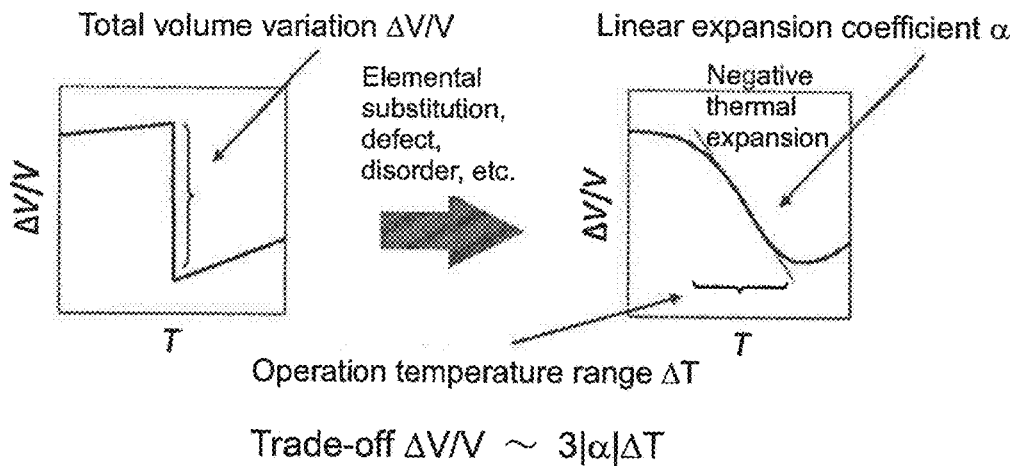
FIG. 1 A conceptual illustration of the ruthenium oxide of the present disclosure.

[Structure of Ruthenium Oxide of the Present Disclosure]

The ruthenium oxide of the present disclosure is a novel substance represented by the formula $Ca_{2-x}R_xRu_{1-y}M_yO_{4+z}$ and characterized by oxygen content z (i.e., the value z in the formula) and/or total volume variation $\Delta V/V$ (the definition thereof will be described below). Particularly, the ruthenium oxide exhibits negative thermal expansion. In the formula, R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: $0 \leq x < 0.2$ and $0 \leq y < 0.3$.

The ruthenium oxide of the present disclosure is a Mott insulator exhibiting metal-insulator transition. The negative thermal expansion of the ruthenium oxide of the present disclosure is phase-transition-type negative thermal expansion achieved by a phase-transition-induced continuous variation in volume with respect to temperature (see FIG. 1).

The ruthenium oxide of the present disclosure preferably has a layered perovskite crystal structure. The ruthenium oxide may have a rhombic system (orthorhombic system), a tetragonal system, a monoclinic system, or a trigonal system, and preferably has a rhombic system.

In the ruthenium oxide of the present disclosure, variation in the proportions of constitutive elements may be generally allowed. However, such variations do not depart from the gist of the present disclosure. For example, the ruthenium oxide of the present disclosure includes $Ca_2RuO_{3.9}$ in which the Ca:Ru proportions are 2.01:0.99.

[R in Formula]

In the aforementioned formula, R is at least one element selected from among alkaline earth metals and rare earth elements. The type of the element R or the R content x (i.e., the value x in the formula) can be varied to regulate the temperature range exhibiting negative thermal expansion, the total volume variation $\Delta V/V$, or the thermal expansion coefficient. R is preferably at least one element of Sr, Ba, Y, La, Ce, Pr, Nd, and Sm, more preferably at least one element of Sr and Ba, much more preferably Sr. Based on common technical sense in oxide synthesis, it is expected that if, for example, $Ca_{2-x}Sr_xRuO_{4+z}$ is prepared as described in Examples, a plurality of other alkaline earth elements having similar chemical properties (e.g., Ba) or a plurality of rare earth elements would easily form a solid solution in the Ca site. The gist of the present disclosure resides in that the total volume variation or operation temperature range regarding negative thermal expansion can be regulated through substitution of the Ca site by another metal species. Thus, R is not limited to one single element.

The R content x falls within a range of $0 \leq x < 0.2$. When the R content x falls within this range, the degree of negative thermal expansion can be increased, and the temperature range exhibiting negative thermal expansion, the total volume variation $\Delta V/V$, and the thermal expansion coefficient can be regulated to fall within ranges suitable for industrial applications (e.g., a thermal expansion inhibitor). The R content x falls within a range of more preferably $0 \leq x \leq 0.15$, much more preferably $0 \leq x \leq 0.1$, most preferably $0 \leq x \leq 0.07$. Needless to say, x may be zero.

[M in Formula]

In the aforementioned formula, M is at least one element selected from among Sc, Ti, V, Cr, Mn, Fe, Co, Ni, Cu, Zn, and Ga. The type of the element M or the M content y (i.e., the value y in the formula) can be varied to regulate the temperature range exhibiting negative thermal expansion, the total volume variation $\Delta V/V$, or the thermal expansion coefficient. M is preferably at least one element of Ti, V, Cr, Mn, Fe, Co, Ni, Cu, and Zn, more preferably at least one element of Cr, Mn, Fe, and Cu. Based on common technical sense of oxide synthesis, it is expected that if, for example, $Ca_2Ru_{1-y}Cr_yO_{4+z}$ and $Ca_2Ru_{1-y}Mn_yO_{4+z}$ are prepared as described in Examples, $Ca_2Ru_{1-y1-y2}Cr_{y1}Mn_{y2}O_{4+z}$ would be easily synthesized, and it is also expected that a plurality of transition metals having similar chemical properties (e.g., Ti) other than Cr, Mn, Fe, and Cu (used as M in Examples) would easily form a solid solution in the Ru site. The gist of the present disclosure resides in that negative thermal expansion-relating properties such as total volume variation or operation temperature range can be regulated through substitution of the Ru site by another metal species. Thus, M is not limited to one element.

The M content y falls within a range of $0 \leq y < 0.3$. When the M content y falls within this range, the degree of negative thermal expansion can be increased, and the temperature range exhibiting negative thermal expansion, the total volume variation $\Delta V/V$, and the thermal expansion coefficient can be regulated to fall within ranges suitable for industrial applications (e.g., a thermal expansion inhibitor).

The M content y falls within a range of more preferably $0 \leq y \leq 0.2$, much more preferably $0 \leq y \leq 0.13$, most preferably $0 \leq y \leq 0.1$. Needless to say, y may be zero.

[Another Mode of the Ruthenium Oxide Falling within the Scope of the Present Disclosure]

Another ruthenium oxide of the present disclosure is a novel substance represented by the formula $Ca_{2-x}R_x Ru_{1-y1-y2}Sn_{y1}M_{y2}O_{4+z}$ and characterized by the Sn content y1 (i.e., the value y1 in the formula). In particular, the ruthenium oxide exhibits negative thermal expansion. In the formula, R and M are the same elements as those described above. Specifically, R represents at least one element selected from among alkaline earth metals and rare earth elements, and M represents at least one element selected from among Sc, Ti, V, Cr, Mn, Fe, Co, Ni, Cu, Zn, and Ga. Also, the following relations are satisfied: $0 \leq x < 0.2$, $0 < y1 < 0.5$, $0.5 \leq y2 \leq 0.2$, $0 < y1+y2 \leq 0.6$, and $-1 < z < 1$. The ruthenium oxide of the present disclosure may be characterized by the Sn content y1; i.e., the below-described oxygen content z or total volume variation $\Delta V/V$ is not necessarily a factor for specifying the ruthenium oxide. However, the ruthenium oxide may also be characterized by the oxygen content z or the total volume variation $\Delta V/V$ besides the Sn content y1.

In the above ruthenium oxide of the present disclosure, the R content x falls within the same range as described above (i.e., $0 \leq x < 0.2$). The R content x falls within a range of more preferably $0 \leq x \leq 0.15$, much more preferably $0 \leq x \leq 0.1$, most preferably $0 \leq x \leq 0.07$. Needless to say, x may be zero.

In the ruthenium oxide of the present disclosure, the Sn content y1 falls within a range of $0 < y1 < 0.5$. Sn-containing ruthenium oxide has not been reported regardless of the oxygen content z; i.e., the ruthenium oxide is a novel substance. As illustrated in the present disclosure, when the Sn content y1 falls within the above range, the degree of negative thermal expansion can be increased, and the temperature range exhibiting negative thermal expansion, the total volume variation $\Delta V/V$, and the thermal expansion coefficient can be regulated to fall within ranges suitable for industrial applications (e.g., a thermal expansion inhibitor). In particular, Sn is more inexpensive than Ru, and the ruthenium oxide of the present disclosure can exhibit negative thermal expansion even if a portion of the Ru site is substituted by a large amount of Sn. Thus, an inexpensive negative thermal expansion material may be achieved, which is industrially very advantageous. Substitution of the Ru site by Sn can widen the temperature range exhibiting negative thermal expansion, and particularly can increase the maximum temperature Tmax exhibiting negative thermal expansion. The Sn content y1 falls within a range of more preferably $0 < y1 \leq 0.45$, much more preferably $0 < y1 \leq 0.4$, most preferably $0 < y1 \leq 0.3$.

In the above ruthenium oxide of the present disclosure, the sum of the Sn content y1 and the M content y2 (i.e., y1+y2) falls within a range of $0 < y1+y2 \leq 0.6$. When the sum (y1+y2) falls within this range, the degree of negative thermal expansion can be increased, and the temperature range exhibiting negative thermal expansion, the total volume variation $\Delta V/V$, and the thermal expansion coefficient can be regulated to fall within ranges suitable for industrial applications (e.g., a thermal expansion inhibitor). The sum (y1+y2) falls within a range of more preferably $0 < y1+y2 \leq 0.5$, much more preferably $0 < y1+y2 \leq 0.4$, most preferably $0 < y1+y2 \leq 0.35$. Besides the sum (y1+y2), the M content y2 falls within a range of preferably $0 \leq y2 \leq 0.2$, more preferably $0 \leq y2 \leq 0.13$, most preferably $0 \leq y2 \leq 0.1$. Needless to say, y2 may be zero.

[Oxygen Content Z]

When the ruthenium oxide of the present disclosure is characterized by the oxygen content z, the oxygen content z falls within a range of $-1 < z < -0.02$. Hitherto, it has been reported that "oxygen excess (Z>0) can be achieved, but oxygen deficiency (Z<0) is difficult to achieve" (e.g., F. Nakamura, et al., Sci. Rep. 3, 2536 (2103)). This idea has been generally perceived before filing of the present application. Thus, a ruthenium oxide having an oxygen content z falling within a range of $-1 < z < -0.02$ has been unknown; i.e., the ruthenium oxide is a novel substance. When the oxygen content z falls within the above range, a ruthenium oxide exhibiting negative thermal expansion with a large total volume variation $\Delta V/V$ can be achieved. Also, negative thermal expansion can be achieved in a broad temperature range, and a large negative linear expansion coefficient can be achieved. The oxygen content z falls within a range of preferably $-0.5 < z < -0.02$, more preferably $-0.4 < z < -0.03$, much more preferably $-0.4 < z < -0.05$, most preferably $-0.35 < z < -0.05$.

In general, technical difficulty is encountered in determining the oxygen content of an oxide, and measurements of the oxygen content may include experimental errors. Thus, the oxygen content z of the ruthenium oxide may fail to be satisfactorily determined. Even in such a case, the ruthenium oxide of the present disclosure can be characterized by the total volume variation $\Delta V/V$.

When the ruthenium oxide of the present disclosure is characterized by a factor other than the oxygen content z; i.e., when the ruthenium oxide of the present disclosure is characterized by the total volume variation $\Delta V/V$, the oxygen content z falls within a range of $-1 < z < 1$, preferably $-0.5 < z < 0.2$, more preferably $-0.4 < z < 0.1$, much more preferably $-0.35 < z < 0.05$, most preferably $-0.3 < z < 0.01$.

[Total Volume Variation $\Delta V/V$]

The total volume variation $\Delta V/V$ is defined as described below. The temperature range exhibiting negative thermal expansion is from Tmin to Tmax (Tmin<Tmax), and the volumes at Tmin and Tmax are represented by Vmin and Vmax, respectively. Thus, Tmin is the lowest temperature exhibiting negative thermal expansion, and Tmax is the highest temperature exhibiting negative thermal expansion. The total volume variation $\Delta V/V$ is a value obtained by (Vmin−Vmax)/Vmax (see FIG. 1). The total volume variation $\Delta V/V$ is an index for determining the degree of negative thermal expansion. The degree of negative thermal expansion is determined by such a value for the reasons described below.

The negative thermal expansion of the ruthenium oxide of the present disclosure is "phase-transition-type" negative thermal expansion achieved by a phase-transition-induced continuous variation in volume with respect to temperature through introduction of, for example, element substitution, crystal defect, or disordered crystal structure (see FIG. 1). In such phase-transition-type negative thermal expansion, the gradient $\alpha$ of linear thermal expansion, the operation temperature range $\Delta T$, and the total volume variation $\Delta V/V$ roughly satisfy the following relation: $\Delta V/V \approx 3|\alpha|\Delta T$ (which is not strictly satisfied, since $\alpha$ is not necessarily constant within the temperature range exhibiting negative thermal expansion). In this case, the linear expansion coefficient corresponds to linear thermal expansion determined in an isotropic substance or a polycrystalline substance prepared through sintering of crystal powder, and the gradient $\alpha$ and the volume expansion coefficient $\beta$ regarding volumetric thermal expansion satisfy the following relation: $\alpha = (1/3)\beta$. Thus, the degree of negative thermal expansion and the operation temperature range are in a trade-off relationship. In general, an increase in operation temperature range leads to a decrease in negative gradient, whereas an increase in negative gradient leads to a decrease in operation temperature range. Thus, the thermal expansion reducing ability (degree of negative thermal expansion) of such a phase-transition-type negative thermal expansion material must be evaluated not only by the linear expansion coefficient $\alpha$, but also by the total volume variation $\Delta V/V$.

The ruthenium oxide of the present disclosure is characterized by a total volume variation $\Delta V/V$ more than 1%. A ruthenium oxide exhibiting such a large total volume variation $\Delta V/V$ has been unknown; i.e., the ruthenium oxide of the present disclosure is a novel substance. There is no clear reason why the ruthenium oxide of the present disclosure exhibits a total volume variation $\Delta V/V$ larger than that of a conventional ruthenium oxide. Although the crystal defect due to oxygen deficiency may affect such a large total volume variation $\Delta V/V$, the possibility of another cause cannot be denied.

A larger total volume variation $\Delta V/V$ is preferred from the viewpoint of industrial use of the ruthenium oxide as a thermal expansion inhibitor. The total volume variation $\Delta V/V$ is preferably 2% or more, more preferably 3% or more, much more preferably 4% or more, most preferably 6% or more. No particular limitation is imposed on the upper limit of the total volume variation $\Delta V/V$, so long as it falls within a generally conceivable range. However, an extremely large total volume variation $\Delta V/V$ may cause an unstable crystal structure. Thus, the total volume variation $\Delta V/V$ is preferably 30% or less, more preferably 20% or less, much more preferably 16% or less.

[Linear Expansion Coefficient]

In general, the thermal expansion of a solid material is evaluated by linear thermal expansion. The linear thermal expansion at a temperature T is defined by $(L(T)-L0)/L0=\Delta L/L0$ (wherein L(T) represents the length of a sample at the temperature T, and L0 represents the length of the sample at a reference temperature). In the case of a substance having no anisotropic crystal orientation (i.e., an isotropic substance) or a polycrystalline substance prepared through sintering of crystal powder, the linear thermal expansion ($\Delta L/L0$) and the volumetric thermal expansion (i.e., an index of a variation in volume with respect to temperature: $(V(T)-V0)/V0=\Delta V/V0$ (wherein V represents volume)) satisfy the following relation: $\Delta L/L0=(1/3)\Delta V/V0$. The ruthenium oxide of the present disclosure is generally an orthorhombic crystal, and the physical properties (including thermal expansion) of the ruthenium oxide depend on its crystal orientation. In all the Examples and Comparative Examples described herein, a polycrystalline substance prepared through sintering of crystal powder is used for measurement. The resultant linear thermal expansion exhibits averaged crystal orientation dependence and is equal to a third of the volumetric thermal expansion.

The linear expansion coefficient $\alpha$ is the temperature differential of linear thermal expansion, and is defined by $\alpha=d(\Delta L/L0)/dT$. Similarly, the volume expansion coefficient $\beta$ is defined by $\beta=d(\Delta V/V0)/dT$. In the case of an isotropic substance or a polycrystalline substance prepared through sintering of crystal powder, the linear expansion coefficient $\alpha$ and the volume expansion coefficient $\beta$ satisfy the following relation: $\alpha=(1/3)\beta$ as described herein.

The ruthenium oxide of the present disclosure preferably has a linear expansion coefficient $\alpha$ of $-20\times10^{-6}/°$ C. or less. The linear expansion coefficient $\alpha$ as used herein corresponds to the average linear expansion coefficient $\alpha$ in the temperature range exhibiting negative thermal expansion. When the linear expansion coefficient $\alpha$ is $-20\times10^{-6}/°$ C. or less, the ruthenium oxide of the present disclosure can be used in various industrial applications and is highly useful as, for example, a thermal expansion inhibitor. The linear expansion coefficient $\alpha$ is more preferably $-30\times10^{-6}/°$ C. or less, much more preferably $-60\times10^{-6}/°$ C. or less. In general, in the case of a phase-transition-type negative thermal expansion material (e.g., the ruthenium oxide of the present disclosure), a decrease in linear expansion coefficient $\alpha$ (an increase in absolute value of negative value) leads to a decrease in temperature range exhibiting negative thermal expansion; i.e., the linear expansion coefficient $\alpha$ can be decreased without limitation. No particular limitation is imposed on the lower limit of the linear expansion coefficient $\alpha$. However, it should be noted that the lower limit may be determined in consideration of a desired temperature range exhibiting negative thermal expansion.

[Temperature Range Exhibiting Negative Thermal Expansion]

The ruthenium oxide of the present disclosure exhibits large negative thermal expansion over a very wide temperature range. The temperature range exhibiting negative thermal expansion is preferably 100° C. or more as a temperature variation range in view of a wide range of industrial applications of the ruthenium oxide. An appropriately selected ruthenium oxide of the present disclosure can be incorporated into, for example, a member to be used in a high-temperature environment or a device prepared through bonding of a plurality of parts, to thereby regulate the thermal expansion of the member or the device. Also, the ruthenium oxide can be incorporated into a material to be cooled to $-100°$ C. or lower (e.g., parts in a freezer), to thereby regulate the thermal expansion of the material. The ruthenium oxide can exhibit large negative thermal expansion (a linear expansion coefficient of $-20\times10^{-6}/°$ C. or less) within the aforementioned temperature range. The ruthenium oxide of the present disclosure generally exhibits negative thermal expansion within a temperature range including room temperature (27° C.). The upper limit of the temperature range can be adjusted to room temperature or lower through regulation of the R content x or the M content y. In particular, the substitution of a portion of the Ru site by Sn can achieve negative thermal expansion over a wider temperature range, to thereby increase the maximum temperature Tmax exhibiting negative thermal expansion.

The temperature range (corresponding to (Tmax−Tmin) wherein Tmax>Tmin) exhibiting negative thermal expansion is preferably 200° C. or more, more preferably 300° C. or more, most preferably 400° C. or more. No particular limitation is imposed on the upper limit of the temperature range exhibiting negative thermal expansion. However, as described above, the ruthenium oxide of the present disclosure is a phase-transition-type negative thermal expansion material, and thus the negative linear expansion coefficient and the temperature range exhibiting negative thermal expansion are in a trade-off relationship. Accordingly, a very wide temperature range exhibiting negative thermal expansion leads to an increase in linear expansion coefficient (i.e., a decrease in the absolute value of negative linear expansion coefficient). Therefore, the temperature range exhibiting negative thermal expansion is preferably 1,000° C. or less, more preferably 800° C. or less, much more preferably 700° C. or less as a temperature variation range.

[Specific Examples of Ruthenium Oxide of the Present Disclosure]

Specific examples of preferred ruthenium oxides (and formulae thereof) of the present disclosure are described below. Needless to say, the ruthenium oxide of the present disclosure is not limited to these examples.

$Ca_2RuO_{3.7-3.979}$, $Ca_2Ru_{0.85-0.95}Mn_{0.05-0.15}O_{3.7-3.979}$, $Ca_2Ru_{0.87-0.97}Fe_{0.03-0.13}O_{3.7-3.979}$, $Ca_2Ru_{0.85-0.95}Cu_{0.05-0.15}O_{3.7-3.979}$, $Ca_2Ru_{0.8-1.0}Cr_{0.2-0.2}O_{3.7-3.979}$, $Ca_{1.85-2}Sr_{0-0.15}RuO_{3.7-3.979}$, and $Ca_2Ru_{0.55-0.97}Sn_{0.03-0.45}O_{3.7-4.05}$.

[Production Method]

The ruthenium oxide of the present disclosure is produced through "reductive thermal treatment" of a ruthenium oxide prepared by a conventional method. As used herein, the term "reductive thermal treatment" refers to a thermal treatment in an oxygen-containing atmosphere having an oxygen partial pressure of 0.3 atm or less at a temperature of higher than 1,100° C. and lower than 1,400° C. There is no clear reason why the reductive thermal treatment achieves negative thermal expansion larger than that of conventional ruthenium oxide. Conceivably, the reductive thermal treatment acts on elimination of oxygen from a crystal structure, thereby generating a crystal defect. The crystal defect probably involves the occurrence of large negative thermal expansion. Needless to say, the possibility of another cause is not eliminated.

In the reductive thermal treatment, the oxygen partial pressure is preferably 0.3 atm or less, more preferably 0.25 atm or less, much more preferably 0.22 atm or less. The oxygen partial pressure is preferably 0.05 atm or more, more preferably 0.1 atm or more, much more preferably 0.15 atm or more. No particular limitation is imposed on the total pressure, so long as the oxygen partial pressure falls within the above range. The total pressure is preferably 0.5 to 2.0 atm in view of, for example, ease of the production of the ruthenium oxide. The atmosphere preferably contains an inert gas (e.g., nitrogen or rare gas) besides oxygen. For example, the atmosphere for the reductive thermal treatment of the present disclosure may involve the use of air or a gas mixture of argon and oxygen.

The ruthenium oxide subjected to the reductive thermal treatment is prepared by a conventionally known method, such as a solid-phase reaction method, a liquid-phase growth method, a melt growth method, a vapor-phase growth method, or a vacuum film formation method. Examples of the vacuum film formation method include molecular beam epitaxy (MBE), laser ablation, and sputtering. In particular, the solid-phase reaction method is preferably used for the ruthenium oxide preparation from the viewpoint of, for example, industrial mass production. In the case of the preparation by the solid-phase reaction method, the thermal treatment for a firing process in the method may also serve as the reductive thermal treatment. In such a case, the production process can be simplified. The raw material used in the solid-phase reaction method may be a powder mixture containing the following powders in specific proportions by mole: powder of an oxide or carbonate of R (note: R is the same element as defined above in the formula of the ruthenium oxide of the present disclosure), such as $CaCO_3$ or $La_2O_3$, powder of $RuO_2$, powder of an oxide of M (note: M is the same element as defined above in the formula of the ruthenium oxide of the present disclosure), such as $Cr_2O_3$, and powder of an oxide of Sn, such as $SnO_2$.

The temperature for the reductive thermal treatment is higher than 1,100° C. and lower than 1,400° C. A temperature equal to or higher than 1,400° C. is not preferred in view of generation of ruthenium oxide of another phase, such as $CaRuO_3$. Meanwhile, a temperature equal to or lower than 1,100° C. is not preferred in view of retardation of the reaction and no occurrence of large negative thermal expansion. The temperature more preferably falls within a range of 1,200° C. to 1,390° C., much more preferably a range of 1,250° C. to 1,380° C.

[Thermal Expansion Inhibitor]

The ruthenium oxide of the present disclosure can be used as a thermal expansion inhibitor for canceling and reducing the thermal expansion of a material exhibiting positive thermal expansion.

[Negative Thermal Expansion Material, Low Thermal Expansion Material, and Zero Thermal Expansion Material]

The ruthenium oxide of the present disclosure can be used as a thermal expansion inhibitor (e.g., incorporation of the ruthenium oxide into a material exhibiting positive thermal expansion) for the production of a negative thermal expansion material exhibiting negative thermal expansion within a specific temperature range. Also, the ruthenium oxide of the present disclosure can be used for the production of a zero thermal expansion material exhibiting neither positive thermal expansion nor negative thermal expansion within a specific temperature range. Also, the ruthenium oxide of the present disclosure can be incorporated into a material exhibiting large positive thermal expansion, to thereby produce a low thermal expansion material having a reduced specific positive linear expansion coefficient. For example, quarts ($SiO_2$) ($\alpha \approx 0.5 \times 10^{-6}/°$ C.), silicon (Si) ($\alpha \approx 3 \times 10^{-6}/°$ C.), or silicon carbide (SiC) ($\alpha \approx 5 \times 10^{-6}/°$ C.) is known as a low thermal expansion material. As used herein, the term "low thermal expansion" refers to the level of thermal expansion equal to or less than that of such a material.

In the case where the ruthenium oxide of the present disclosure is used for the production of a negative thermal expansion material, a low thermal expansion material, or a zero thermal expansion material, no particular limitation is imposed on the type of a matrix to be used, so long as the resultant material does not depart from the gist of the present disclosure. The matrix may be any known material, such as glass, resin, ceramic, metal, or alloy. In particular, since the ruthenium oxide of the present disclosure can be used in the form of powder, the ruthenium oxide is suitable for use in a material that can be sintered into any shape, like the case of a ceramic material.

The advantageous effects of the ruthenium oxide of the present disclosure will be summarized below.

Firstly, the present disclosure can achieve a ruthenium oxide of negative thermal expansion exhibiting a total volume variation larger than that of conventional ruthenium oxide. Conventionally known ruthenium oxide of negative thermal expansion exhibits a total volume variation of at most 1%; i.e., there is no conventional ruthenium oxide exhibiting a total volume variation more than 1%. In contrast, the present disclosure can achieve a ruthenium oxide exhibiting a total volume variation more than 1%; for example, a total volume variation of 6% or more. The linear expansion coefficient of the ruthenium oxide of the present disclosure can be adjusted to less than $-20 \times 10^{-6}/°$ C.; for example, less than $-100 \times 10^{-6}/°$ C. Thus, the ruthenium oxide can be widely used as an industrial thermal expansion inhibitor. In particular, the ruthenium oxide can be used for reducing the thermal expansion of a material exhibiting large thermal expansion (e.g., a resin or an organic material).

Secondly, the ruthenium oxide of the present disclosure exhibits negative thermal expansion over a very wide temperature range. For example, the ruthenium oxide exhibits negative thermal expansion with a linear expansion coefficient of less than $-20 \times 10^{-6}/°$ C. over a wide temperature range of 400° C. or higher. In particular, the substitution of a portion of the Ru site by Sn can achieve negative thermal expansion over a wider temperature range (e.g., 500° C. or more) and can increase the maximum temperature Tmax exhibiting negative thermal expansion. Thus, the ruthenium oxide can be used for reducing the thermal expansion of, for example, a material to be heated to 400° C. or higher. Accordingly, an appropriately selected thermal expansion inhibitor can be incorporated into, for example, a member to be used in a high-temperature environment or a device prepared through bonding of a plurality of parts, to thereby regulate the thermal expansion of the member or the device. The ruthenium oxide can also be incorporated into a material to be cooled to −100° C. or lower (e.g., parts in a freezer), to thereby regulate the thermal expansion of the material.

Thirdly, the ruthenium oxide of the present disclosure can be used in the form of powder. Thus, the ruthenium oxide can be sintered into any shape, like the case of a ceramic material. The ruthenium oxide can be readily mixed with a raw material.

Fourthly, the ruthenium oxide of the pressure disclosure can be formed of environmentally friendly raw materials, and thus is preferred from the environmental viewpoint. Since a portion of the Ru site can be substituted by inexpensive Sn, the production cost can be reduced.

With reference to the drawings, the present disclosure will next be described in detail by way of Examples, which should not be construed as limiting the disclosure thereto. The materials used, amounts thereof, proportions thereof, processes, and procedures described below in the Examples may be appropriately varied without departing from the gist of the present disclosure.

Example 1

(1) Preparation of Ruthenium Oxide $Ca_2Ru_{1-y}M_yO_{4+z}$ (M is Cr, Mn, Fe, or Cu, the same shall apply hereinafter) was produced by a solid-phase reaction method by use of the following raw materials: powders of $CaCO_3$, $RuO_2$, $Cr_2O_3$, $Mn_3O_4$, $Fe_3O_4$, and CuO. Firstly, the raw material powders were weighed to achieve the proportions by mole of Ca:Ru:M=2:1-y:y, and the mixture was agitated. Subsequently, the mixture was heated and fired in air or in a stream of a gas mixture (argon: 0.8 atm and oxygen: 0.2 atm) at 1,000° C. to 1,100° C. for 12 to 24 hours.

The resultant powder was agitated and then compacted into a tablet, followed by heating and firing (sintering) in a stream of a gas mixture (argon: 0.8 atm and oxygen: 0.2 atm) at 1,250° C. to 1,370° C. for 40 to 60 hours, to thereby prepare a ruthenium oxide represented by $Ca_2Ru_{1-y}M_yO_{4+z}$. Hereinafter, this thermal treatment will be referred to as "reductive thermal treatment."

For substitution of a portion of Ca by Sr in the ruthenium oxide $Ca_2Ru_{1-y}M_yO_{4+z}$, $CaCO_3$ (i.e., a starting material) was partially replaced by a specific amount by mole of $SrCO_3$, and the resultant mixture was subjected to the aforementioned process.

All the raw material powders used for the aforementioned sample preparation had a purity of 99.9% or more and a particle size of 1 to 50 μm. The prepared sample was subjected to powder X-ray diffractometry (the Debye-Scherrer method), to thereby determine that the sample was in a single phase and had a rhombic structure at room temperature.

The heating (firing) was also performed at, for example, 1,400° C. In this case, a ruthenium oxide of another phase (e.g., $CaRuO_3$) was prepared; i.e., a sample of single phase was not prepared. The firing was also performed at, for example, 1,100° C. In this case, a portion of the raw material powders remained unreacted, and a sample of single phase was not prepared.

(2) Linear Thermal Expansion of Ruthenium Oxide

The above-prepared sample of Example 1-1 was subjected to measurement in terms of total volume variation $\Delta V/V$, linear expansion coefficient $\alpha$, temperature range $\Delta T$ exhibiting negative thermal expansion, minimum temperature Tmin exhibiting negative thermal expansion, and maximum temperature Tmax exhibiting negative thermal expansion. The linear thermal expansion of the ruthenium oxide was measured by means of a laser interference thermal expansion meter (LIX-2, manufactured by ULVAC, Inc.) within a temperature range of −183° C. to 227° C. The total volume variation $\Delta V/V$, the linear expansion coefficient $\alpha$, $\Delta T$, Tmin, and Tmax were determined on the basis of the results of measurement of the linear thermal expansion. The linear expansion coefficient $\alpha$ corresponds to a representative value within the temperature range exhibiting negative linear thermal expansion.

Figure 2:
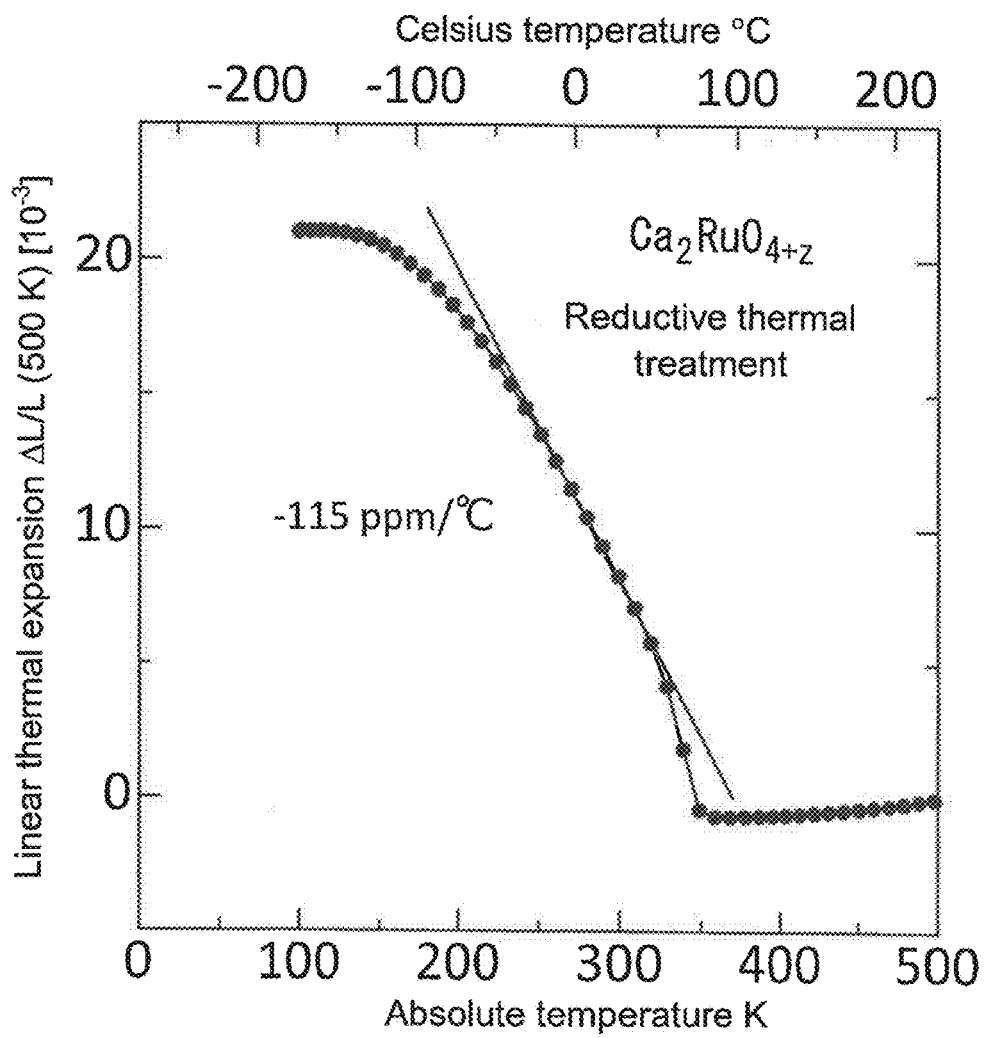
FIG. 2 A graph showing the linear thermal expansion of a ruthenium oxide of the present disclosure.

Table 1 shows the results of measurement. In Table 1, the first to tenth chemical formulae correspond to Example 1, and the eleventh to thirteenth chemical formulae correspond to Example 2 described below. FIGS. 2 to 7 are graphs showing the linear thermal expansions of samples of Examples. The linear thermal expansion is a value with reference to that at 500 K. Each numeral of the column "Figure" in Table 1 shows the corresponding graph of linear thermal expansion among FIGS. 2 to 7. FIG. 2 is a graph showing the linear thermal expansion of a sample represented by the formula $Ca_2RuO_{4+z}$. FIGS. 3 to 6 are graphs showing the linear thermal expansions of samples represented by the formula $Ca_2Ru_{1-y}M_yO_{4+z}$ with the type of the element M or the value y being varied. FIG. 7 is a graph showing the linear thermal expansions of samples represented by the formula $Ca_{2-x}Sr_xRuO_{4+z}$ with the value x being varied.

For comparison, the characteristic values of conventionally typical negative thermal expansion materials are shown in Table 2. In Table 2, the linear expansion coefficient α is an average value in the case of the material having an anisotropic crystal structure. The characteristic values shown in Table 2 are cited from the following references.

REFERENCES

*1: T. A. Mary, et al., Science 272, 90-92 (1996).

*2: A. E. Phillips, et al., Angew. Chem. Int. Ed. 47, 1396-1399 (2008).

*3: K. Takenaka and H. Takagi, Appl. Phys. Lett. 87, 261902 (2005).

*4: J. Chen, et al., Appl. Phys. Lett. 89, 101914 (2006).

*5: I. Yamada, et al., Angew. Chem. Int. Ed. 50, 6579-6582 (2011).

*6: M. Azuma, et al., Nature Commun. 2, 347 (2011).

*7: R. J. Huang, et al., J. Am. Chem. Soc. 135, 11469-11472 (2013).

*8: Y. Y. Zhao, et al., J. Am. Chem. Soc. 137, 1746-1749 (2015).

TABLE 1

| Chemical formula | ΔV/V [%] | Tmin [° C.] | Tmax [° C.] | ΔT [° C.] | α [ppm/° C.] | FIG. |
|---|---|---|---|---|---|---|
| $Ca_2RuO_{4+z}$ | 6.7 | −138 | 72 | 210 | −115 | 2 |
| $Ca_2Ru_{0.9}Mn_{0.1}O_{4+z}$ | 3.1 | *−183 | 197 | 380 | −40 | 3 |
| $Ca_2Ru_{0.92}Fe_{0.08}O_{4+z}$ | 2.8 | *−183 | *227 | 410 | −28 | 4 |
| $Ca_2Ru_{0.9}Cu_{0.1}O_{4+z}$ | 4.4 | −143 | 157 | 300 | −61 | 5 |
| $Ca_2Ru_{0.98}Cr_{0.02}O_{4+z}$ | 6.5 | *−183 | 47 | 230 | −105 | 6 |
| $Ca_2Ru_{0.95}Cr_{0.05}O_{4+z}$ | 2.3 | *−183 | −18 | 165 | −58 | 6 |
| $Ca_2Ru_{0.933}Cr_{0.067}O_{4+z}$ | 1.6 | *−183 | −63 | 120 | −48 | 6 |
| $Ca_2Ru_{0.9}Cr_{0.1}O_{4+z}$ | 0.5 | *−183 | −133 | 50 | −48 | 6 |
| $Ca_{1.95}Sr_{0.05}RuO_{4+z}$ | 4.7 | *−183 | 17 | 200 | −70 | 7 |
| $Ca_{1.9}Sr_{0.1}RuO_{4+z}$ | 3.5 | *−183 | −78 | 105 | −48 | 7 |
| $Ca_2Ru_{0.9}Sn_{0.1}O_{4+z}$ | 4.8 | −123 | 392 | 515 | −43 | 8 |
| $Ca_2Ru_{0.7}Sn_{0.3}O_{4+z}$ | 4.0 | −108 | *427 | 535 | −32 | 8 |
| $Ca_2Ru_{0.6}Sn_{0.4}O_{4+z}$ | 1.0 | −70 | *227 | 297 | −12 | 8 |

In Table 1, the value Tmin or Tmax marked with * refers to that negative thermal expansion was observed at the lower limit of measurement temperature (−183° C.) or the upper limit of measurement temperature (227° C.), respectively. It is readily understood that negative thermal expansion would be actually observed at a temperature lower than the Tmin or higher than the Tmax.

TABLE 2

| Negative thermal expansion substance/material | ΔV/V [%] | Tmin [° C.] | Tmax [° C.] | ΔT [° C.] | α [ppm/° C.] | Crystal system | Reference |
|---|---|---|---|---|---|---|---|
| $ZrW_2O_8$ | 1.2 | −273 | 152 | 425 | −9 | Cubic | *1 |
| $Cd(CN)_2$ | 2.1 | −103 | 102 | 205 | −34 | Cubic | *2 |
| $Mn_3Ga_{0.7}Ge_{0.3}N_{0.88}C_{0.12}$ | 0.5 | −76 | 46 | 122 | −18 | Cubic | *3 |
| $0.4PbTiO_3—0.6BiFeO_3$ | 2.7 | 25 | 650 | 625 | −13 | Tetragonal | *4 |
| $SrCu_3Fe_4O_{12}$ | 0.4 | −93 | −23 | 70 | −20 | Cubic | *5 |
| $Bi_{0.95}La_{0.05}NiO_3$ | 2.0 | 47 | 107 | 60 | −82 | Triclinic | *6 |
| $LaFe_{10.5}Co_{1.0}Si_{1.5}$ | 1.1 | −33 | 77 | 110 | −26 | Cubic | *7 |
| $MnCo_{0.98}Cr_{0.02}Ge$ | 3.2 | −151 | 59 | 210 | −52 | Rhombic | *8 |

The comparison between Tables 1 and 2 shows that the ruthenium oxide of the present disclosure exhibits a total volume variation ΔV/V much larger than that of a conventional negative thermal expansion material. The temperature range ΔT exhibiting negative thermal expansion of the ruthenium oxide is equal to or wider than that of a conventional negative thermal expansion material, and the linear expansion coefficient α of the ruthenium oxide is equal to or smaller than that of a conventional negative thermal expansion material. Thus, the ruthenium oxide of the present disclosure, which exhibits the degree of negative thermal expansion higher than that of a conventional negative thermal expansion material, is industrially valuable.

Figure 3:
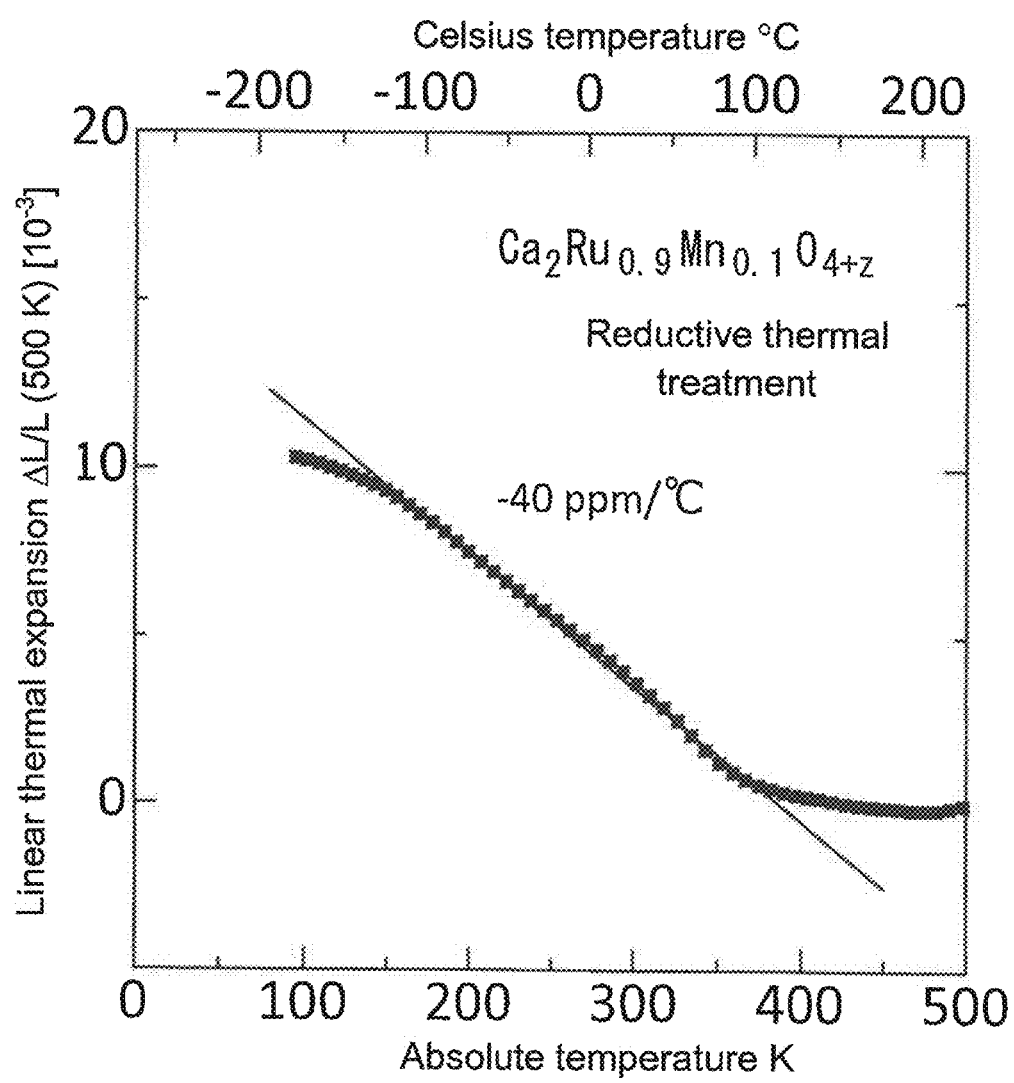
FIG. 3 A graph showing the linear thermal expansion of a ruthenium oxide of the present disclosure.
Figure 4:
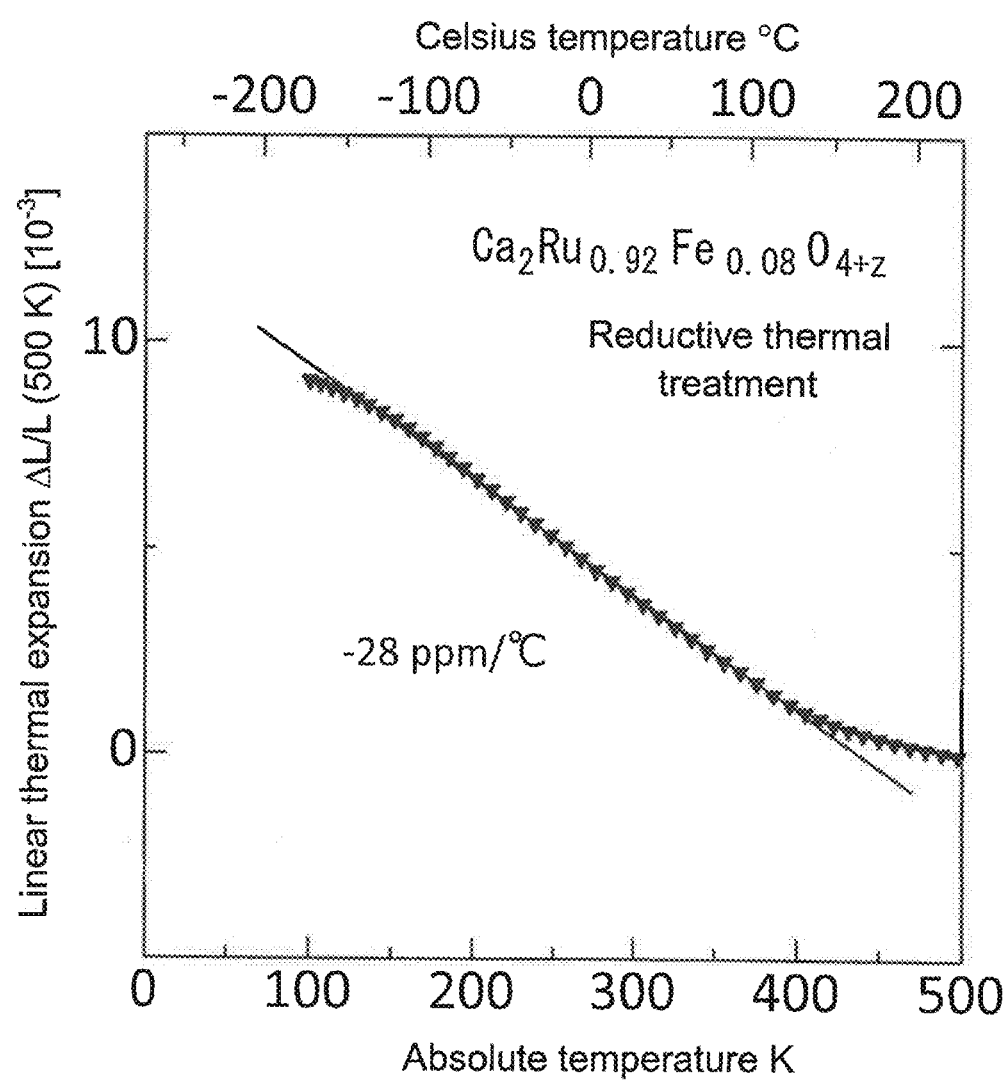
FIG. 4 A graph showing the linear thermal expansion of a ruthenium oxide of the present disclosure.
Figure 5:
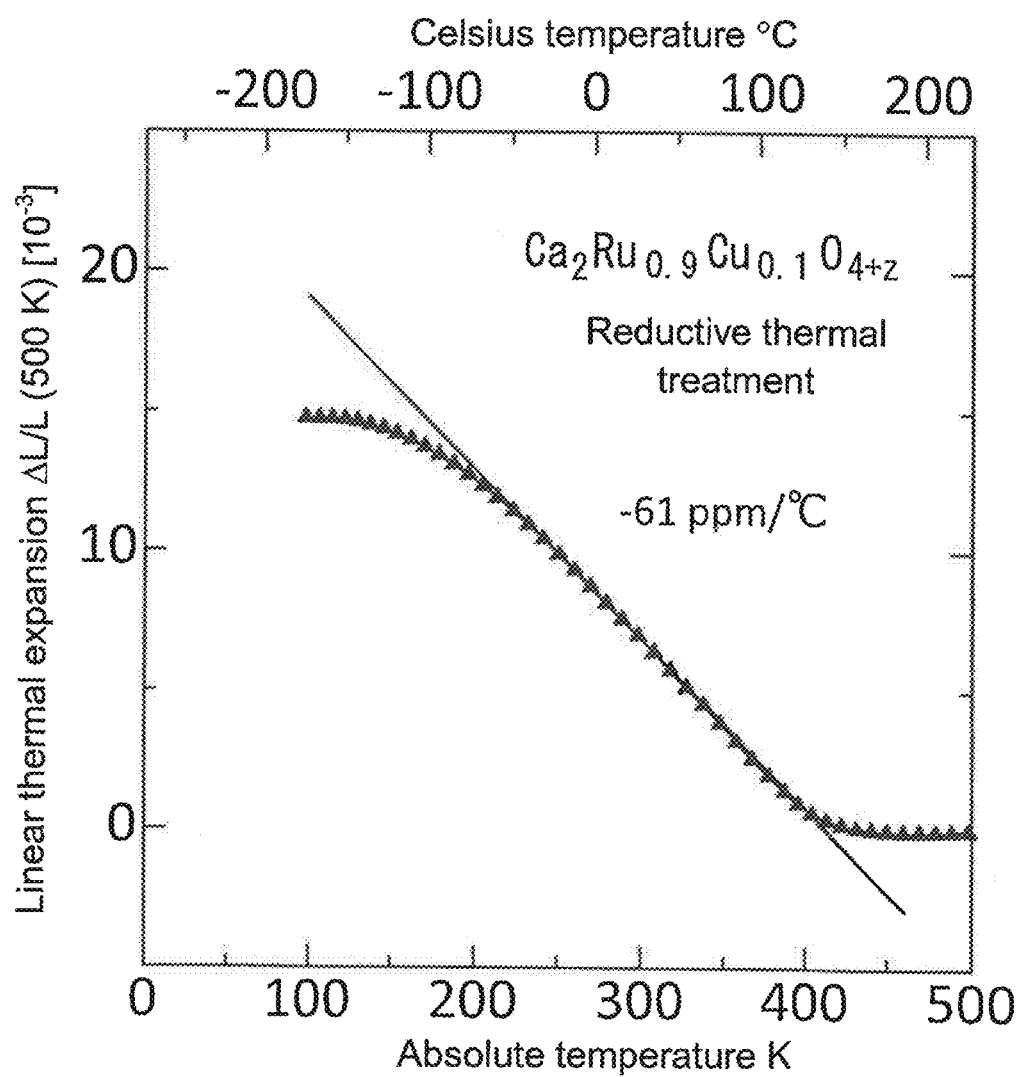
FIG. 5 A graph showing the linear thermal expansion of a ruthenium oxide of the present disclosure.
Figure 6:
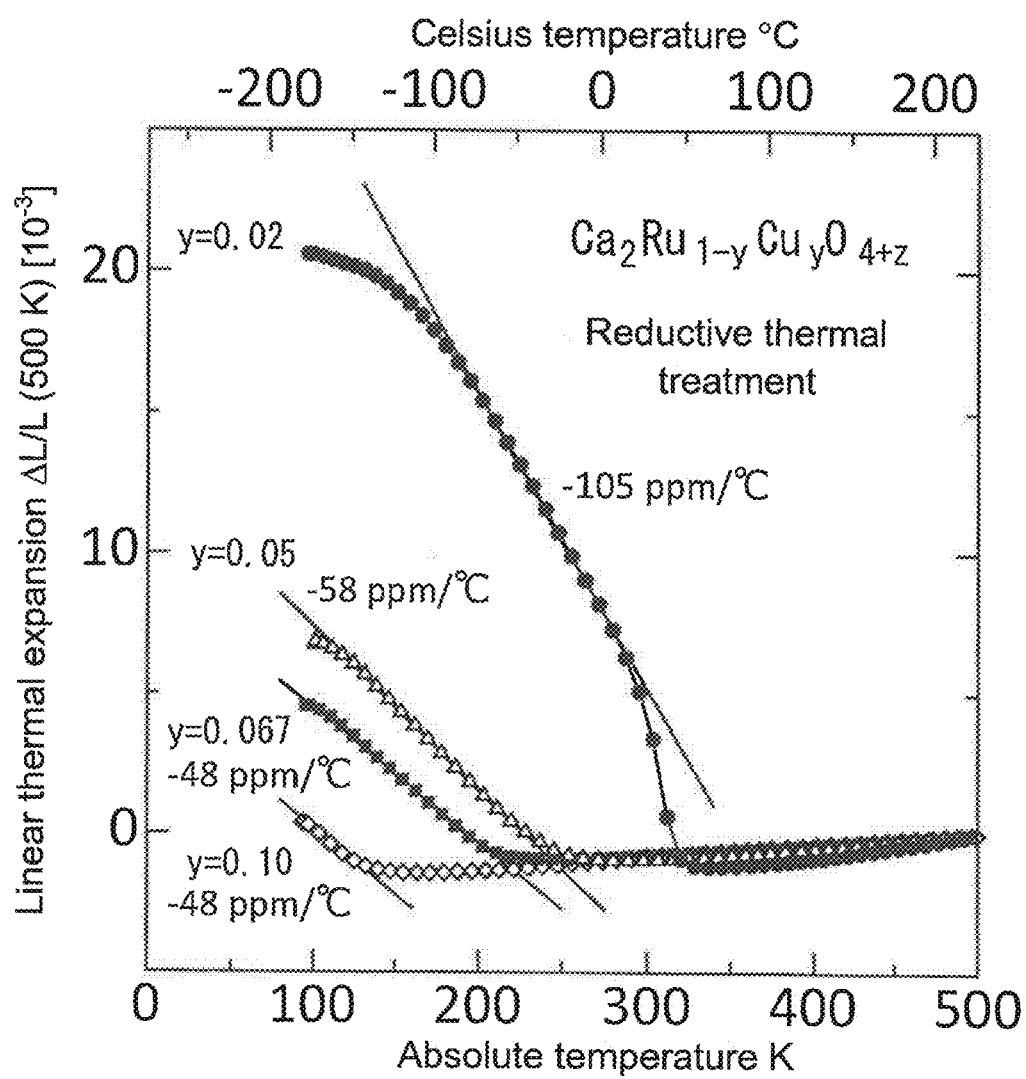
FIG. 6 A graph showing the linear thermal expansion of a ruthenium oxide of the present disclosure.
Figure 7:
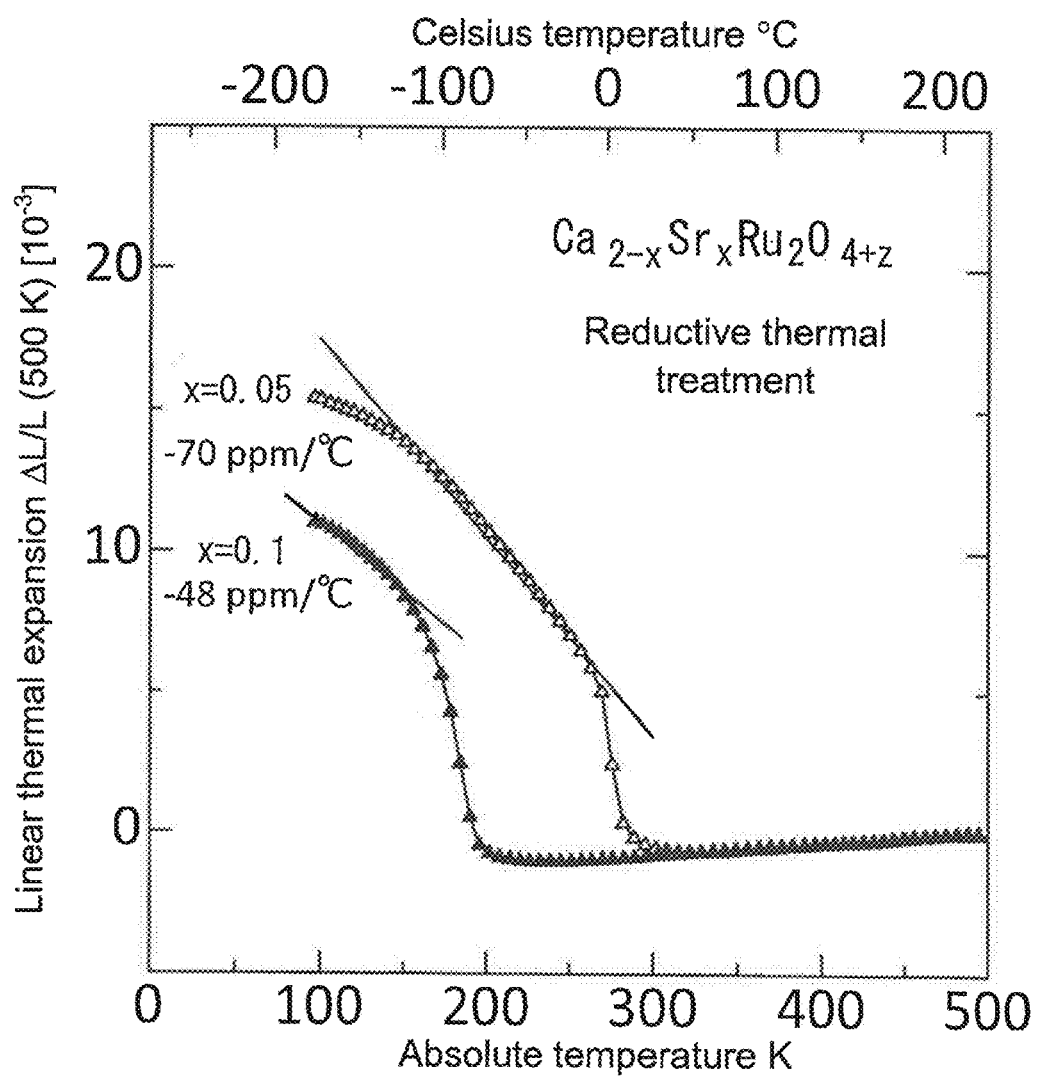
FIG. 7 A graph showing the linear thermal expansion of a ruthenium oxide of the present disclosure.

As shown in Table 1 and FIGS. 2 to 7, the R content x, the element M, and the M content y of $Ca_{2-x}R_xRu_{1-y}M_yO_{4+z}$ can be varied to regulate the total volume variation ΔV/V, the linear expansion coefficient α, ΔT, Tmin, and Tmax. As shown in FIGS. 3 to 5, when M is Mn, Fe, or Cu, an increase in M content tends to lead to an increase in Tmax and an increase in linear expansion coefficient α (a decrease in absolute value of negative value). As shown in FIGS. 6 and 7, when R is Sr or M is Cr, an increase in R content x or M content y tends to lead to a decrease in Tmax and an increase in linear expansion coefficient α (a decrease in negative absolute value). The total volume variation ΔV/V, ΔT, and Tmin, which fall outside the measurement range and are not clearly determined, probably decrease in association with an increase in M content y.

(3) Evaluation of Reductive Thermal Treatment

The below-described experiments were performed for determining whether the reductive thermal treatment contributes to occurrence of large negative thermal expansion according to the present disclosure.

In Comparative Example 1, a ruthenium oxide $Ca_2RuO_{4+z}$ was prepared by the method described below. Firstly, the ruthenium oxide $Ca_2RuO_{4+z}$ (hereinafter referred to as "ruthenium oxide of Example 1-1") was prepared by means of the reductive thermal treatment described above in "(1) Preparation of ruthenium oxide." The sintered product prepared through this reductive thermal treatment was then heated in an atmosphere of oxygen at 4 to 5 atm and at 500° C. to 550° C. for 40 to 60 hours. Hereinafter, this thermal treatment will be referred to as "high-pressure oxygen treatment." The ruthenium oxide prepared through this treatment is regarded as the ruthenium oxide of Comparative Example 1. The linear thermal expansion of the ruthenium oxide of Comparative Example 1 was determined, and the ruthenium oxide was found to exhibit no or very little negative thermal expansion.

The ruthenium oxide $Ca_2RuO_{4+z}$ of Comparative Example 1 prepared through the high-pressure oxygen treatment was then heated in a stream of a gas mixture (argon: 0.8 atm and oxygen: 0.2 atm) at 1,250° C. to 1,370° C. for 40 to 60 hours, to thereby prepare a ruthenium oxide. The ruthenium oxide was regarded as that of Example 1-2.

Figure 12:
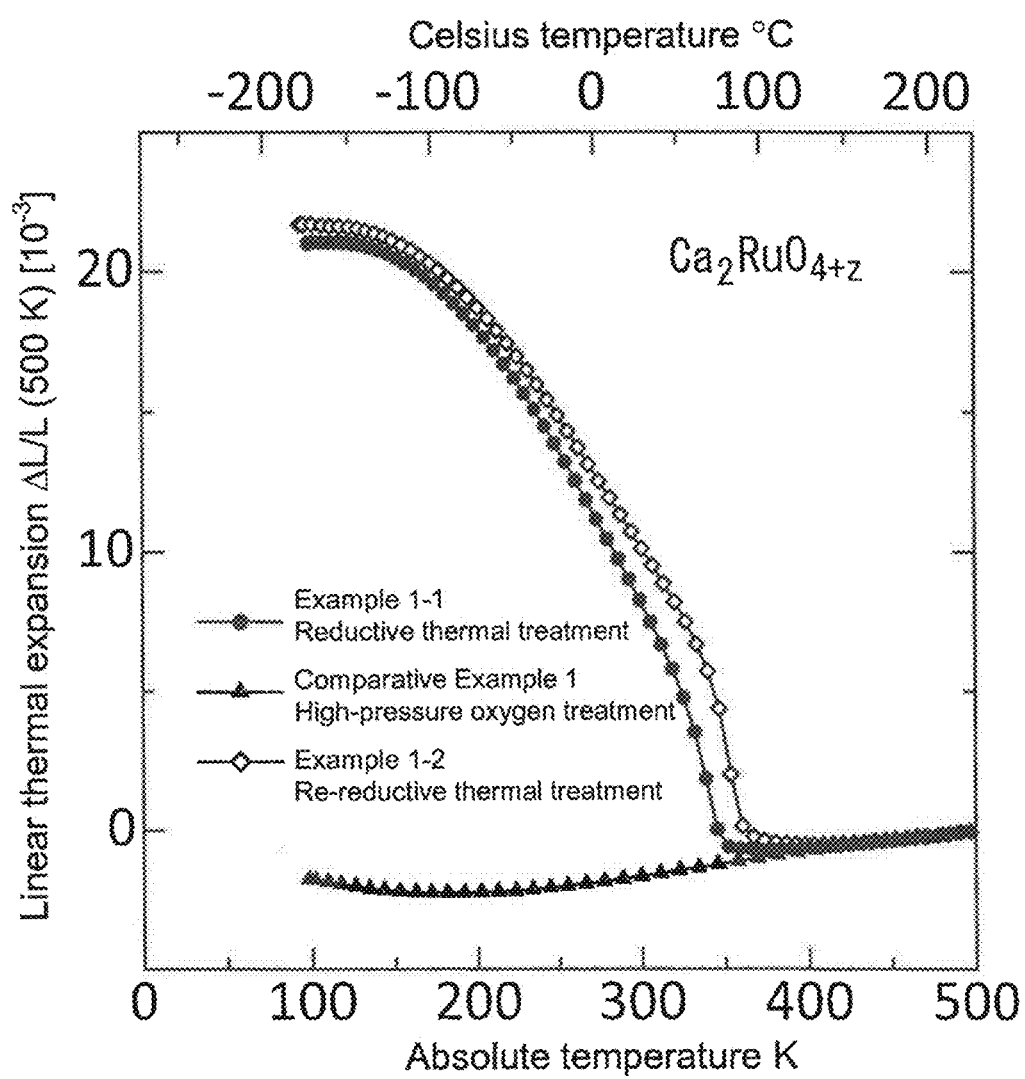
FIG. 12 A graph showing the linear thermal expansion of a ruthenium oxide of the present disclosure.

FIG. 12 is a graph showing the linear thermal expansions of the ruthenium oxides of Examples 1-1 and 1-2 and Comparative Example 1. As shown in FIG. 12, the large negative thermal expansion of the ruthenium oxide of Example 1-1, which is achieved through the reductive thermal treatment, is considerably reduced by the high-pressure oxygen treatment. Although the large negative thermal expansion was lost by the high-pressure oxygen treatment (i.e., the ruthenium oxide of Comparative Example 1), the negative thermal expansion was found to be restored, by performing the reductive thermal treatment again, to a level equal to that before the high-pressure oxygen treatment. The results demonstrate that the reductive thermal treatment is essential for achievement of the large negative thermal expansion of the ruthenium oxide.

(4) Evaluation of Oxygen Content z

It has been reported that the ruthenium oxide $Ca_2Ru_{1-y}M_yO_{4+z}$ has an oxygen content z falling within a range of −0.01(1)≤z≤0.07(1) (i.e., −0.02≤z≤0.08 in much consideration of errors) (Non-Patent Document 2). The ruthenium oxide of Comparative Example 1 prepared through the high-pressure oxygen treatment is regarded as containing a sufficient amount of oxygen (z is nearly equal to 0.07). An increase in sample weight by 1 to 2% through the aforementioned high-pressure oxygen treatment was determined by means of a precise electronic balance (XP56, manufactured by METTLER TOLEDO). This weight variation corresponds to an increase in 0.15 to 0.30 in terms of z. Thus, the ruthenium oxide of Example 1 is considered to have an oxygen content z of −0.23 to −0.08; i.e., the ruthenium oxide is a substance having an unknown oxygen content z. Hitherto, it has been reported that "oxygen excess (Z>0) can be achieved, but oxygen deficiency (Z<0) is difficult to achieve" (e.g., F. Nakamura, et al., Sci. Rep. 3, 2536 (2103)). This idea has been generally perceived before filing of the present application. In general, technical difficulty is encountered in determining the oxygen content of an oxide, and the resultant measurements should be considered to include experimental errors. Thus, it should be noted that the aforementioned measurements of oxygen content may include experimental errors.

Example 2

$Ca_2Ru_{1-y}Sn_yO_{4+z}$ was produced by a solid-phase reaction method by use of the following raw materials: powders of $CaCO_3$, $RuO_2$, and $SnO_2$. Firstly, the raw material powders were weighed to achieve the proportions by mole of Ca:Ru:Sn=2:1-y:y, and the mixture was agitated. Subsequently, the mixture was heated and fired in air or in a stream of a gas mixture (argon: 0.8 atm and oxygen: 0.2 atm) at 1,000° C. to 1,100° C. for 12 to 24 hours.

The resultant powder was agitated and then compacted into a tablet, followed by heating and firing (sintering) in a stream of a gas mixture (argon: 0.8 atm and oxygen: 0.2 atm) at 1,250° C. to 1,370° C. for 40 to 60 hours, to thereby prepare a ruthenium oxide represented by $Ca_2Ru_{1-y}Sn_yO_{4+z}$.

The linear thermal expansion of the ruthenium oxide represented by $Ca_2Ru_{1-y}Sn_yO_{4+z}$ was measured in the same manner as employed in Example 1. The total volume variation $\Delta V/V$, the linear expansion coefficient $\alpha$, $\Delta T$, Tmin, and Tmax were determined on the basis of the results of measurement of the linear thermal expansion. In some experiments, the upper limit of the temperature for measurement of linear thermal expansion was adjusted to 427° C.

Figure 8:
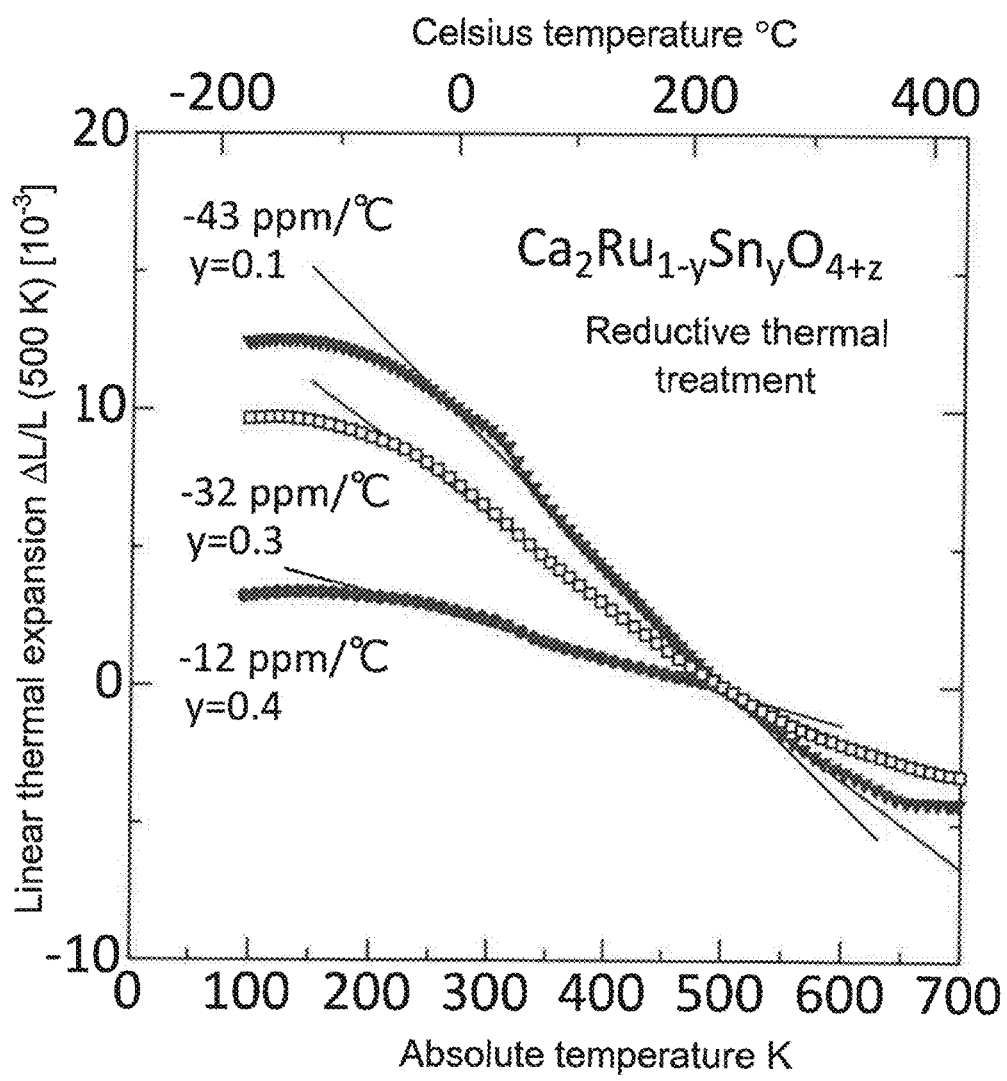
FIG. 8 A graph showing the linear thermal expansion of a ruthenium oxide of the present disclosure.

The results of measurement of the ruthenium oxide of Example 2 are shown in Table 1 described above in Example 1. In Table 1, the eleventh to thirteenth chemical formulae correspond to Example 2. The symbol "*" in Table 1 has the same meaning as described above. In Table 1, the value Tmin or Tmax marked with * refers to that negative thermal expansion was observed at the lower limit of measurement temperature (−183° C.) or the upper limit of measurement temperature (427° C.), respectively. It is readily understood that negative thermal expansion would be actually observed at a temperature lower than the Tmin or higher than the Tmax. FIG. 8 is a graph showing the linear thermal expansion of the ruthenium oxide. As shown in Table 1 and FIG. 8, similar to the ruthenium oxide of Example 1, the ruthenium oxide of Example 2 exhibits a total volume variation $\Delta V/V$ much larger than that of a conventional negative thermal expansion material. The temperature range $\Delta T$ exhibiting negative thermal expansion of the ruthenium oxide of Example 2 is equal to or wider than that of a conventional negative thermal expansion material, and the linear expansion coefficient $\alpha$ of the ruthenium oxide of Example 2 is equal to or smaller than that of a conventional negative thermal expansion material. Thus, the ruthenium oxide of Example 2 exhibits the degree of negative thermal expansion higher than that of a conventional negative thermal expansion material.

In particular, the substitution of a portion of the Ru site by Sn achieved a very wide temperature range $\Delta T$ exhibiting negative thermal expansion and a considerable increase in maximum temperature Tmax exhibiting negative thermal expansion. For example, an Sn content y of 0.3 achieved $\Delta T$ of 535° C. and Tmax of at least 427° C.; i.e., an increase in the temperature range exhibiting negative thermal expansion. This is very meaningful in view of industrial use of the ruthenium oxide.

As shown in Table 1 and FIG. 8, an increase in Sn content y tends to lead to an increase in linear thermal expansion coefficient (i.e., a decrease in absolute value of negative linear thermal expansion coefficient), an increase in temperature range $\Delta T$ exhibiting negative thermal expansion, and an increase in maximum temperature Tmax exhibiting negative thermal expansion. Thus, the Sn content y can be varied to regulate the linear expansion coefficient, $\Delta T$, and Tmax.

As described above, the ruthenium oxide of Example 2 represented by $Ca_2Ru_{1-y}Sn_yO_{4+z}$, in which a portion of the Ru site is substituted by Sn, exhibits a wide temperature range $\Delta T$ exhibiting negative thermal expansion and a high maximum temperature Tmax exhibiting negative thermal expansion. Thus, the ruthenium oxide is very suitable for industrial used in, for example, a thermal expansion inhibitor. Since Sn is more inexpensive than Ru, the ruthenium oxide is industrially advantageous in view of a reduction in material cost.

Example 3

Figure 9:
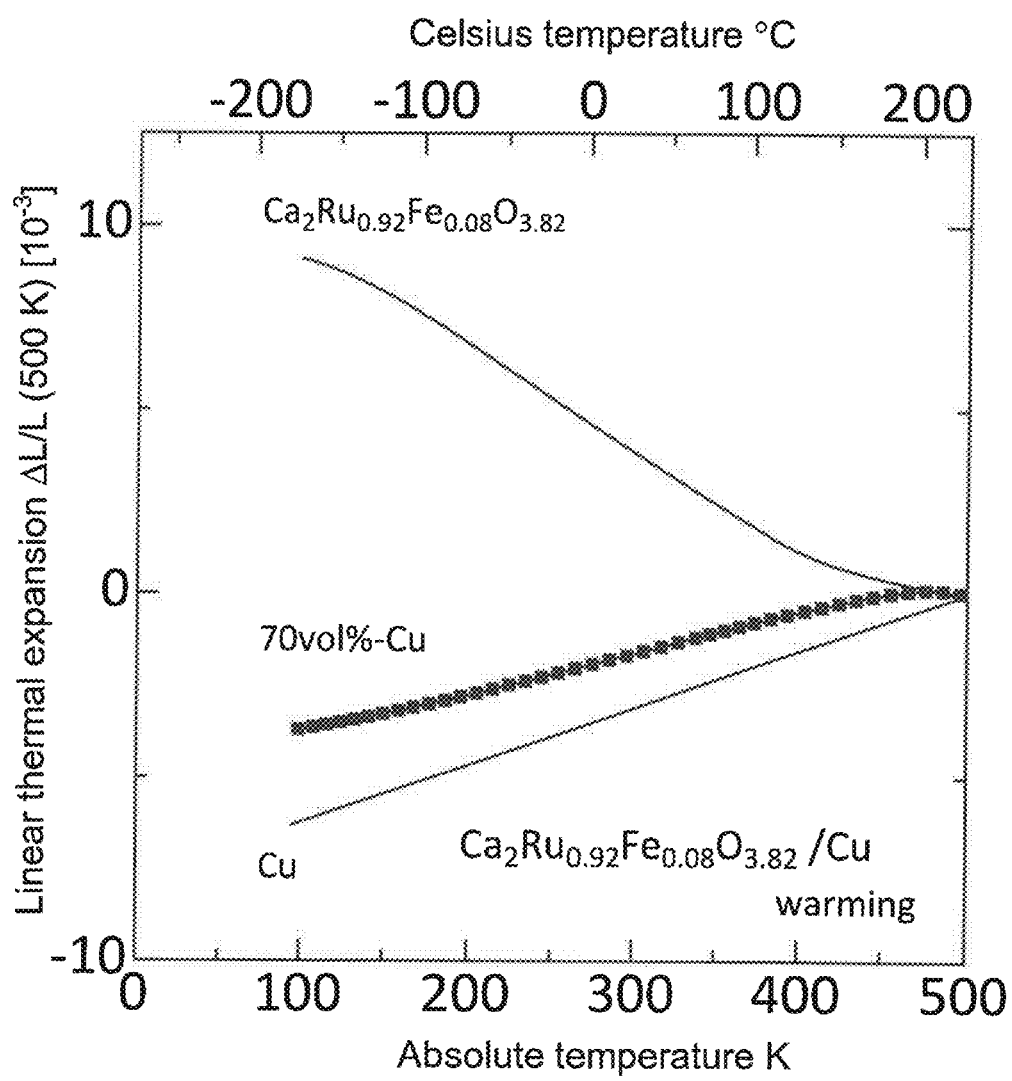
FIG. 9 A graph showing the linear thermal expansion of a ruthenium oxide of the present disclosure.
Figure 10:
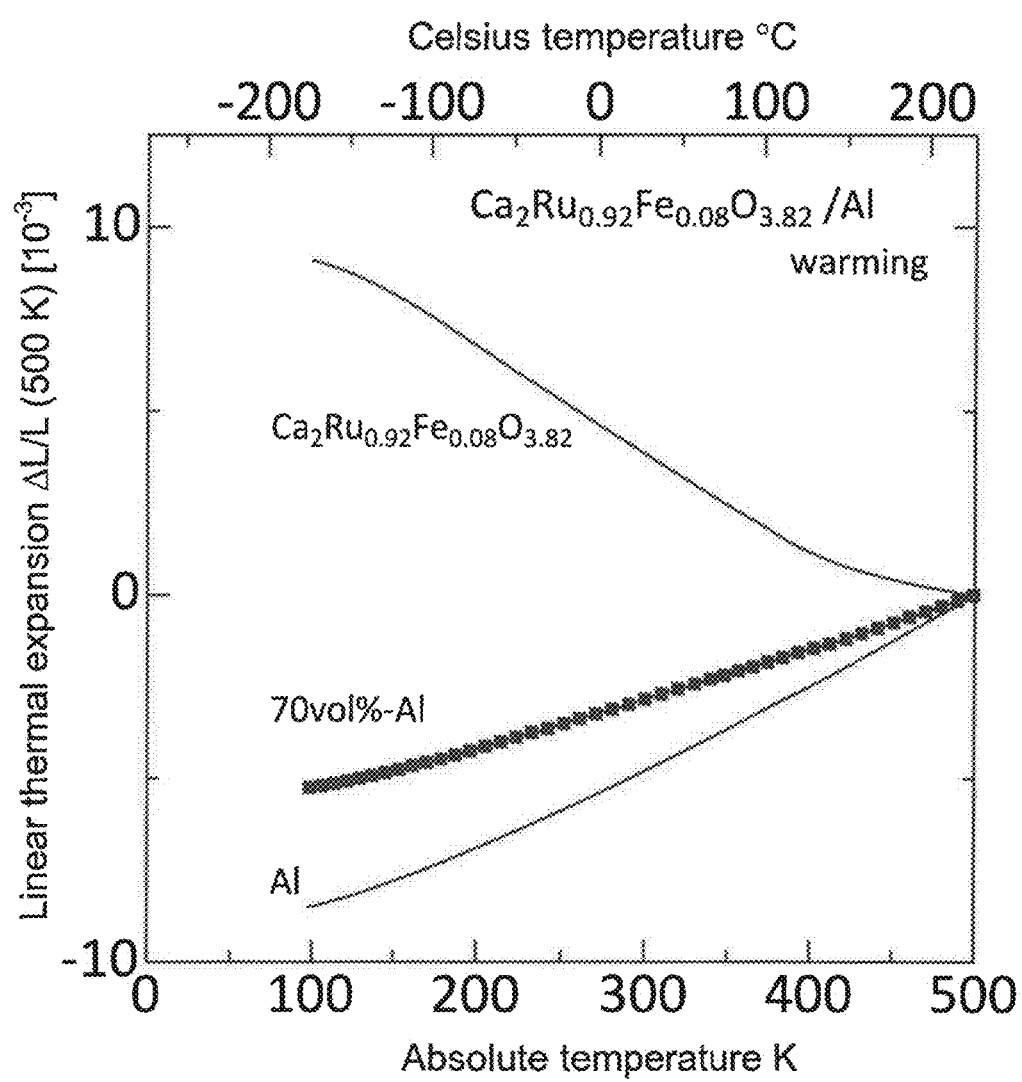
FIG. 10 A graph showing the linear thermal expansion of a ruthenium oxide of the present disclosure.
Figure 11:
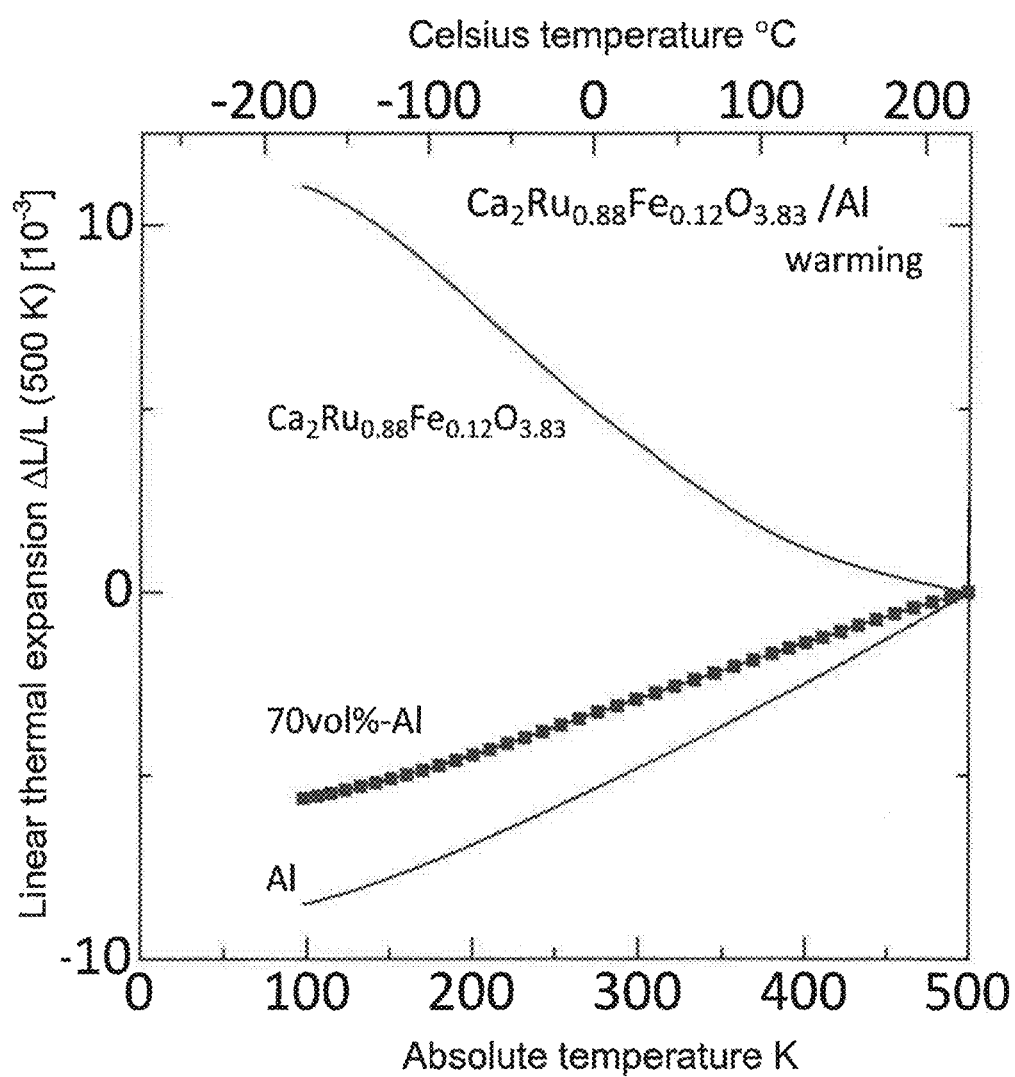
FIG. 11 A graph showing the linear thermal expansion of a ruthenium oxide of the present disclosure.

A ruthenium oxide represented by formula $Ca_2Ru_{0.88}Fe_{0.12}O_{3.83}$ was prepared in the same manner as employed in Example 1. The ruthenium oxide was then mixed with and dispersed in Al, to thereby produce a composite material having an Al content by volume of 70%. Similarly, a ruthenium oxide represented by the formula $Ca_2Ru_{0.92}Fe_{0.08}O_{3.82}$ was prepared, and the ruthenium oxide was mixed with and dispersed in Al or Cu, to thereby produce a composite material having an Al content by volume of 70% or a composite material having a Cu content by volume of 70%. The ruthenium oxides and the composite materials were subjected to measurement of linear thermal expansion in the same manner as employed in Example 1. FIGS. 9 to 11 are graphs showing the thus-measured linear thermal expansions.

As shown in FIGS. 9 to 11, each of the prepared ruthenium oxides exhibits negative thermal expansion, and a composite material produced by mixing of the ruthenium oxide with Al or Cu (note: Al or Cu exhibits positive thermal expansion) exhibits positive thermal expansion at a level lower than that of Al or Cu; i.e., the composite material has a reduced linear thermal expansion coefficient. The results demonstrate that mixing of the ruthenium oxide of the present disclosure with Al or Cu can achieve a decrease in linear thermal expansion coefficient; i.e., the ruthenium oxide can be used as a thermal expansion inhibitor. The results also demonstrate that incorporation of the ruthenium oxide of the present disclosure can achieve a negative thermal expansion material, a zero thermal expansion material, or a low thermal expansion material.

As described above, the present disclosure provides a ruthenium oxide, a thermal expansion inhibitor, a negative thermal expansion material, a zero thermal expansion material, a low thermal expansion material, and a ruthenium oxide production method. These are specifically described in in the following items.

[Item 1]

A ruthenium oxide represented by the following formula (1):

$$Ca_{2-x}R_xRu_{1-y}M_yO_{4+z} \quad \text{formula (1):}$$

(wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: $0 \leq x < 0.2$, $0 \leq y < 0.3$, and $-1 < z < -0.02$).

[Item 2]

A ruthenium oxide according to item 1, wherein, in the formula (1), R is at least one element of Sr, Ba, Y, La, Ce, Pr, Nd, and Sm, and M is at least one element of Ti, V, Cr, Mn, Fe, Co, Ni, Cu, and Zn.

[Item 3]

A ruthenium oxide according to item 1, wherein, in the formula (1), R is at least one element of Sr and Ba, and M is at least one element of Cr, Mn, Fe, and Cu.

[Item 4]

A ruthenium oxide according to item 1, wherein, in the formula (1), the following relation is satisfied: $x=y=0$.

[Item 5]

A ruthenium oxide represented by the following formula (2):

$$Ca_{2-x}R_xRu_{1-y}M_yO_{4+z} \quad \text{formula (2):}$$

(wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: $0 \leq x < 0.2$, $0 \leq y < 0.3$, and $-1 < z < 1$), the ruthenium oxide being characterized by exhibiting negative thermal expansion from a temperature Tmin to a temperature Tmax (Tmin<Tmax), and exhibiting a total volume variation $\Delta V/V$ more than 1%, wherein the total volume variation $\Delta V/V$ is the ratio of a difference between the volume at the temperature Tmin and the volume at the temperature Tmax to the volume at the temperature Tmax.

[Item 6]

A ruthenium oxide according to item 5, wherein, in the formula (2), R is at least one element of Sr, Ba, Y, La, Ce, Pr, Nd, and Sm, and M is at least one element of Ti, V, Cr, Mn, Fe, Co, Ni, Cu, and Zn.

[Item 7]

A ruthenium oxide according to item 5, wherein, in the formula (2), R is at least one element of Sr and Ba, and M is at least one element of Cr, Mn, Fe, and Cu.

[Item 8]

A ruthenium oxide according to item 5, wherein, in the formula (2), the following relation is satisfied: $x=y=0$.

[Item 9]

A ruthenium oxide represented by the following formula (3):

$$Ca_{2-x}R_xRu_{1-y1-y2}Sn_{y1}M_{y2}O_{4+z} \quad \text{formula (3):}$$

(wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: $0 \leq x < 0.2$, $0 < y1 < 0.5$, $0 \leq y2 \leq 0.2$, $0 < y1+y2 \leq 0.6$, and $-1 < z < 1$).

[Item 10]

A ruthenium oxide according to item 9, wherein, in the formula (3), R is at least one element of Sr, Ba, Y, La, Ce, Pr, Nd, and Sm, and M is at least one element of Ti, V, Cr, Mn, Fe, Co, Ni, Cu, and Zn.

[Item 11]

A ruthenium oxide according to item 9, wherein, in the formula (3), R is at least one element of Sr and Ba, and M is at least one element of Cr, Mn, Fe, and Cu.

[Item 12]

A ruthenium oxide according to item 9, wherein, in the formula (3), the following relation is satisfied: $x=y2=0$.

[Item 13]

A ruthenium oxide according to any of items 1 to 4 and 9 to 12, wherein the ruthenium oxide exhibits negative thermal expansion from a temperature Tmin to a temperature Tmax (Tmin<Tmax), and exhibits a total volume variation $\Delta V/V$ more than 1%, wherein the total volume variation $\Delta V/V$ is the ratio of a difference between the volume at the temperature Tmin and the volume at the temperature Tmax to the volume at the temperature Tmax.

[Item 14]

A ruthenium oxide according to any of items 1 to 13, wherein the ruthenium oxide exhibits a linear expansion coefficient of $-20 \times 10^{-6}/°$ C. or less.

[Item 15]

A ruthenium oxide according to any of items 1 to 14, wherein the ruthenium oxide exhibits negative thermal expansion over a temperature range of 100° C. or higher.

[Item 16]

A ruthenium oxide according to any of items 1 to 15, wherein the ruthenium oxide has a layered perovskite crystal structure.

[Item 17]

A thermal expansion inhibitor characterized by comprising a ruthenium oxide as recited in any of items 1 to 16.

[Item 18]

A negative thermal expansion material characterized by comprising a ruthenium oxide as recited in any of items 1 to 16.

[Item 19]

A zero thermal expansion material characterized by comprising a ruthenium oxide as recited in any of items 1 to 16.

[Item 20]

A low thermal expansion material characterized by comprising a ruthenium oxide as recited in any of items 1 to 16.

[Item 21]

A method for producing a ruthenium oxide, the method being characterized by comprising a reductive thermal treatment step of thermally treating a ruthenium oxide represented by the following formula (4):

$$Ca_{2-x}R_xRu_{1-y}M_yO_{4+z} \quad \text{formula (4):}$$

(wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: $0 \leq x < 0.2$, $0 \leq y < 0.3$, and $-1 < z < 1$) in an oxygen-containing atmosphere having an oxygen partial pressure of 0.3 atm or less at a temperature higher than 1,100° C. and lower than 1,400° C.

[Item 22]

A method for producing a ruthenium oxide according to item 21, wherein, in the formula (4), R is at least one element of Sr, Ba, Y, La, Ce, Pr, Nd, and Sm, and M is at least one element of Ti, V, Cr, Mn, Fe, Co, Ni, Cu, and Zn.

[Item 23]

A method for producing a ruthenium oxide according to item 21, wherein, in the formula (4), R is at least one element of Sr and Ba, and M is at least one element of Cr, Mn, Fe, and Cu.

[Item 24]

A method for producing a ruthenium oxide according to item 21, wherein, in the formula (4), the following relation is satisfied: x=y=0.

[Item 25]

A method for producing a ruthenium oxide, the method being characterized by comprising a reductive thermal treatment step of thermally treating a ruthenium oxide represented by the following formula (5):

$$Ca_{2-x}R_xRu_{1-y1-y2}Sn_{y1}M_{y2}O_{4+z} \qquad \text{formula (5):}$$

(wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: 0≤x<0.2, 0<y1<0.5, 0≤y2≤0.2, 0<y1+y2≤0.6, and −1<z<1) in an oxygen-containing atmosphere having an oxygen partial pressure of 0.3 atm or less at a temperature higher than 1,100° C. and lower than 1,400° C.

[Item 26]

A method for producing a ruthenium oxide according to item 25, wherein, in the formula (5), R is at least one element of Sr, Ba, Y, La, Ce, Pr, Nd, and Sm, and M is at least one element of Ti, V, Cr, Mn, Fe, Co, Ni, Cu, and Zn.

[Item 27]

A method for producing a ruthenium oxide according to item 25, wherein, in the formula (5), R is at least one element of Sr and Ba, and M is at least one element of Cr, Mn, Fe, and Cu.

[Item 28]

A method for producing a ruthenium oxide according to item 25, wherein, in the formula (5), the following relation is satisfied: x=y2=0.

[Item 29]

A method for producing a ruthenium oxide according to any of items 21 to 28, wherein the ruthenium oxide is prepared in a firing step involving a solid-phase reaction, and the firing step also serves as the reductive thermal treatment step.

[Item 30]

A method for producing a ruthenium oxide according to any of items 21 to 28, wherein the ruthenium oxide is prepared in a firing step involving a solid-phase reaction, and the firing step is followed by the reductive thermal treatment step.

[Item 31]

A composite material characterized by comprising a ruthenium oxide as recited in any of items 1 to 16 and Al or Cu.

INDUSTRIAL APPLICABILITY

The ruthenium oxide of the present disclosure can be used as a thermal expansion inhibitor for canceling and reducing the thermal expansion exhibited by a common material. The ruthenium oxide of the present disclosure can be used for the production of a negative thermal expansion material exhibiting negative thermal expansion within a specific temperature range. Also, the ruthenium oxide of the present disclosure can be used for the production of a zero thermal expansion material exhibiting neither positive thermal expansion nor negative thermal expansion within a specific temperature range.

Specifically, the ruthenium oxide of the present disclosure can be used in applications adversely affected by a temperature-dependent change in shape or size, such as precise optical parts and mechanical parts, process units and tools, temperature compensation materials for fiber gratings, printed circuit boards, electronic part sealing materials, thermal switches, freezer parts, and satellite parts.

The invention claimed is:

1. A ruthenium oxide represented by the following formula (1):

$$Ca_{2-x}R_xRu_{1-y}M_yO_{4+z} \qquad \text{formula (1):}$$

(wherein R represents at least one element selected from among Ba, Y, La, Ce, Pr, Nd, and Sm; M represents at least one element selected from among Sc, Ti, V, Cr, Mn, Fe, Co, Ni, Cu, Zn, and Ga; and the following relations are satisfied: 0≤x<0.2, 0≤y<0.3, and −1<z<−0.02, wherein at least one of x and y is not 0).

2. A ruthenium oxide according to claim 1, wherein, in the formula (1), M is at least one element of Ti, V, Cr, Mn, Fe, Co, Ni, Cu, and Zn.

3. A ruthenium oxide according to claim 1, wherein, in the formula (1), R is Ba, and M is at least one element of Cr, Mn, Fe, and Cu.

4. A ruthenium oxide represented by the following formula (2):

$$Ca_{2-x}R_xRu_{1-y}M_yO_{4+z} \qquad \text{formula (2):}$$

(wherein R represents at least one element selected from among Ba, Y, La, Ce, Pr, Nd, and Sm; M represents at least one element selected from among Sc, Ti, V, Mn, Fe, Co, Ni, Cu, Zn, and Ga; and the following relations are satisfied: 0≤x<0.2, 0≤y<0.3, and −1<z<1, wherein at least one of x and y is not 0), the ruthenium oxide exhibiting negative thermal expansion from a temperature Tmin to a temperature Tmax (Tmin<Tmax), and exhibiting a total volume variation ΔV/V more than 1%, wherein the total volume variation ΔV/V is the ratio of a difference between the volume at the temperature Tmin and the volume at the temperature Tmax to the volume at the temperature Tmax.

5. A ruthenium oxide according to claim 4, wherein, in the formula (2), M is at least one element of Ti, V, Mn, Fe, Co, Ni, Cu, and Zn.

6. A ruthenium oxide according to claim 4, wherein, in the formula (2), R is Ba, and M is at least one element of Mn, Fe, and Cu.

7. A ruthenium oxide represented by the following formula (3):

$$Ca_{2-x}R_xRu_{1-y1-y2}Sn_{y1}M_{y2}O_{4+z} \qquad \text{formula (3):}$$

(wherein R represents at least one element selected from among alkaline earth metals and rare earth elements; M represents at least one element selected from among Sc, Ti, V, Cr, Mn, Fe, Co, Ni, Cu, Zn, and Ga; and the following relations are satisfied: 0≤x<0.2, 0<y1<0.5, 0≤y2≤0.2, 0<y1+y2≤0.6, and −1<z<1).

8. A ruthenium oxide according to claim 7, wherein, in the formula (3), R is at least one element of Sr, Ba, Y, La, Ce, Pr, Nd, and Sm, and M is at least one element of Ti, V, Cr, Mn, Fe, Co, Ni, Cu, and Zn.

9. A ruthenium oxide according to claim 7, wherein, in the formula (3), R is at least one element of Sr and Ba, and M is at least one element of Cr, Mn, Fe, and Cu.

10. A ruthenium oxide according to claim 7, wherein, in the formula (3), the following relation is satisfied: x=y2=0.

11. A ruthenium oxide according to claim 7, wherein the ruthenium oxide exhibits negative thermal expansion from a temperature Tmin to a temperature Tmax (Tmin<Tmax), and exhibits a total volume variation ΔV/V more than 1%, wherein the total volume variation ΔV/V is the ratio of a difference between the volume at the temperature Tmin and the volume at the temperature Tmax to the volume at the temperature Tmax.

12. A ruthenium oxide according to claim 7, wherein the ruthenium oxide exhibits a linear expansion coefficient of $-20\times10^{-6}/°$ C. or less.

13. A ruthenium oxide according to claim 7, wherein the ruthenium oxide exhibits negative thermal expansion at 100° C. or higher.

14. A ruthenium oxide according to claim 7, wherein the ruthenium oxide has a layered perovskite crystal structure.

15. A thermal expansion inhibitor comprised by a ruthenium oxide as recited in claim 7.

16. A negative thermal expansion material comprised by a ruthenium oxide as recited in claim 7.

17. A zero thermal expansion material comprised by a ruthenium oxide as recited in claim 7.

18. A low thermal expansion material comprised by a ruthenium oxide as recited in claim 7.

* * * * *